United States Patent
Nojiri et al.

(10) Patent No.: US 8,813,070 B2
(45) Date of Patent: Aug. 19, 2014

(54) DATA PROCESSOR WITH INTERFACES FOR PERIPHERAL DEVICES

(75) Inventors: Tohru Nojiri, Tokyo (JP); Yuki Kondoh, Hino (JP)

(73) Assignee: Renesas Electronics Corporation, Kawasaki-shi (JP)

(*) Notice: Subject to any disclaimer, the term of this patent is extended or adjusted under 35 U.S.C. 154(b) by 929 days.

(21) Appl. No.: 12/958,687

(22) Filed: Dec. 2, 2010

(65) Prior Publication Data
US 2011/0131577 A1    Jun. 2, 2011

(30) Foreign Application Priority Data
Dec. 2, 2009    (JP) .................... 2009-274361

(51) Int. Cl.
G06F 9/455    (2006.01)
G06F 13/10    (2006.01)

(52) U.S. Cl.
CPC ........ *G06F 9/45533* (2013.01); *G06F 9/45541* (2013.01); *G06F 13/102* (2013.01); *G06F 13/105* (2013.01)
USPC ................................ 718/1; 703/24

(58) Field of Classification Search
None
See application file for complete search history.

(56) References Cited

U.S. PATENT DOCUMENTS

| | | | | |
|---|---|---|---|---|
| 4,885,681 A | * | 12/1989 | Umeno et al. | 718/1 |
| 4,887,202 A | * | 12/1989 | Tanaka et al. | 703/21 |
| 7,130,949 B2 | * | 10/2006 | Belmar et al. | 710/260 |
| 7,380,041 B2 | * | 5/2008 | Belmar et al. | 710/260 |
| 7,454,548 B2 | * | 11/2008 | Belmar et al. | 710/260 |
| 7,543,095 B2 | * | 6/2009 | Belmar et al. | 710/260 |
| 2008/0162800 A1 | | 7/2008 | Takashige et al. | |
| 2008/0307213 A1 | | 12/2008 | Sekiguchi et al. | |
| 2010/0083247 A1 | * | 4/2010 | Kanevsky et al. | 718/1 |
| 2011/0131581 A1 | * | 6/2011 | Auernhammer et al. | 718/102 |

FOREIGN PATENT DOCUMENTS

| | | |
|---|---|---|
| JP | 2008-097173 A | 4/2008 |
| JP | 2008-146566 A | 6/2008 |
| JP | 2008-305034 A | 12/2008 |

OTHER PUBLICATIONS

Office Action dated Sep. 12, 2013, in Japanese Patent Application No. 2009-274361.

* cited by examiner

*Primary Examiner* — Qing Wu
(74) *Attorney, Agent, or Firm* — Miles & Stockbridge P.C.

(57) ABSTRACT

This invention is intended to reduce the hypervisor overhead. In the data processor disclosed herein, when a device driver calls for access to a control register to activate a process of a dedicated controlled peripheral device, the access is handled directly without intervention of processing by the hypervisor. When an interrupt is generated from a dedicated controlled peripheral device, a process is directly initiated by the device driver of the operating system governing the peripheral device without intervention of processing by the hypervisor. By implementing this manner of control in the processor, it becomes possible to carry out peripheral device control without intervention of processing by the hypervisor. Thereby, the hypervisor overhead is alleviated.

11 Claims, 10 Drawing Sheets

Fig.4

XVSTRSINS | BL | IC | RTE | SR | SY | LD | SL |

Fig.6

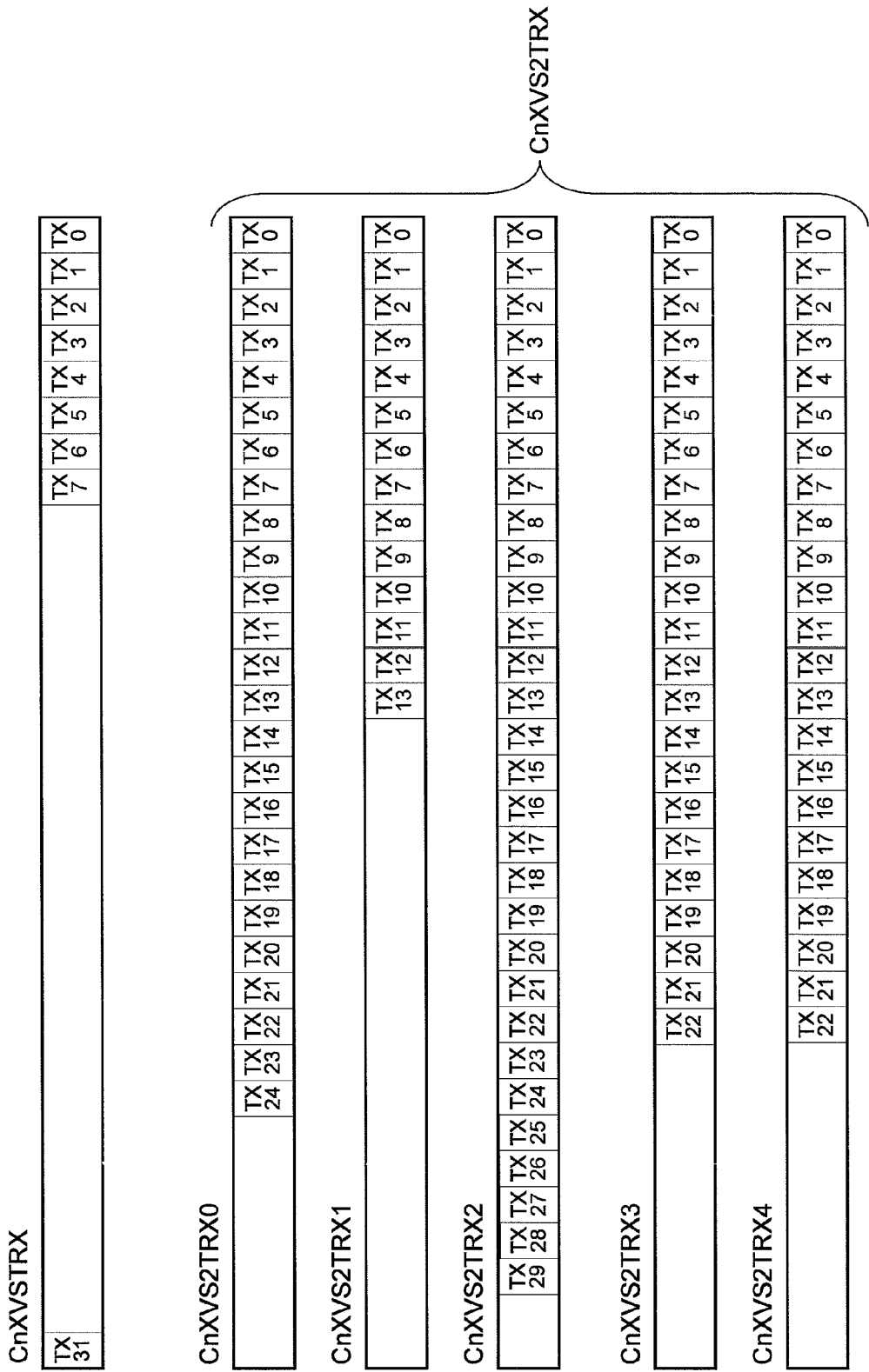

Fig.10

CnXVSSRI
| TX 31 | | | | | | | | |
|---|---|---|---|---|---|---|---|---|
| | | | TX 7 | TX 6 | TX 5 | TX 4 | TX 3 | TX 2 | TX 1 | TX 0 |

CnXVS2SRI0

| TX 24 | TX 23 | TX 22 | TX 21 | TX 20 | TX 19 | TX 18 | TX 17 | TX 16 | TX 15 | TX 14 | TX 13 | TX 12 | TX 11 | TX 10 | TX 9 | TX 8 | TX 7 | TX 6 | TX 5 | TX 4 | TX 3 | TX 2 | TX 1 | TX 0 |

CnXVS2SRI1

| TX 13 | TX 12 | TX 11 | TX 10 | TX 9 | TX 8 | TX 7 | TX 6 | TX 5 | TX 4 | TX 3 | TX 2 | TX 1 | TX 0 |

CnXVS2SRI2

| TX 29 | TX 28 | TX 27 | TX 26 | TX 25 | TX 24 | TX 23 | TX 22 | TX 21 | TX 20 | TX 19 | TX 18 | TX 17 | TX 16 | TX 15 | TX 14 | TX 13 | TX 12 | TX 11 | TX 10 | TX 9 | TX 8 | TX 7 | TX 6 | TX 5 | TX 4 | TX 3 | TX 2 | TX 1 | TX 0 |

CnXVS2SRI3

| TX 22 | TX 21 | TX 20 | TX 19 | TX 18 | TX 17 | TX 16 | TX 15 | TX 14 | TX 13 | TX 12 | TX 11 | TX 10 | TX 9 | TX 8 | TX 7 | TX 6 | TX 5 | TX 4 | TX 3 | TX 2 | TX 1 | TX 0 |

CnXVS2SRI4

| TX 22 | TX 21 | TX 20 | TX 19 | TX 18 | TX 17 | TX 16 | TX 15 | TX 14 | TX 13 | TX 12 | TX 11 | TX 10 | TX 9 | TX 8 | TX 7 | TX 6 | TX 5 | TX 4 | TX 3 | TX 2 | TX 1 | TX 0 |

CnXVS2SRI

DATA PROCESSOR WITH INTERFACES FOR PERIPHERAL DEVICES

CLAIM OF PRIORITY

The present application claims priority from Japanese patent application JP 2009-274361 filed on Dec. 2, 2009, the content of which is hereby incorporated by reference into this application.

FIELD OF THE INVENTION

The present invention relates to a data processor and a technique for reducing an overhead of a hypervisor included in the data processor.

BACKGROUND OF THE INVENTION

A microprocessor can be taken up as an example of a data processor. For a state-of-the-art microprocessor and a system including it, functions required of an application running in the system become more highly functional and complicated along with miniaturization of LSI (Large Scale Integration). In developing highly functional applications, from a perspective of an efficient way of development, it is usual to exploit existing applications and combine them to develop a more highly functional application. In this regard, an existing application is designed to run in a conventional system configured with a conventional microprocessor and such application is inseparable from the configuration of the conventional system. Changing the system configuration takes a considerable amount of man-hours for development, though this amount is less than man-hours that would be taken to develop an existing application again. Therefore, in most cases, existing application programs must be run in their associated conventional systems. In order to combine and run existing applications designed to run in different existing systems, the existing systems need to be combined so that they will cooperate.

The above-mentioned "conventional system" refers to a system configured with a single central processing unit and a single operating system (OS). The above phrase "the existing systems are combined so that they will cooperate" means that, particularly, a number of diverse operating systems are combined so that they will cooperate in parallel.

Patent document 1 describes a technique for combining a plurality of operating systems for conventional systems so that the operating systems will cooperate, while maintaining the reliability and security of each of the conventional systems.
[Prior Art Document]
[Patent Document]
[Patent Document 1] Japanese Laid-Open Patent Application No. 2008-097173

SUMMARY OF THE INVENTION

A virtual machine can be applied also in a built-in system like the one incorporated in a mobile phone. Hypervisor is recognized as a control program for realizing a virtual machine, which is one virtualization technique for computers. The hypervisor runs directly in hardware and all operating systems are run over the hypervisor. In order to increase the efficiency of utilizing hardware resources, it is considered that a plurality of operating systems share all the hardware resources, i.e., all the hardware resources are accessible from each operating system, and the hypervisor situated between the hardware resources and the operating systems performs an arbitration between or among the operating systems with respect to the hardware resources. The present inventors examined this issue and found that an overhead occurs in the hypervisor, as will be described below.

For example, in order that an operating system exerts control of a peripheral device, when its device driver calls for access to a control register or invokes a privileged instruction to activate a process of the peripheral device, the processor generates an exception before handling the access or starting to execute the privileged instruction and transfers the processing control to a processing program of the hypervisor for implementing an arbitration for access to the peripheral device. After the hypervisor processing with regard to the access arbitration, the processor proceeds to handling the access to the control register or executing the privileged instruction before the exception generated, as requested by the device driver that implements control of the peripheral device in the operating system. On the other hand, upon completion of the process activated to the peripheral device, the peripheral device generates an interrupt, causing the transfer of the processing run control of the processor to the hypervisor process execution. After an arbitration between the operating systems has been performed, a process is initiated by the device driver of the operating system that activated the process to the peripheral device. Thus, it takes extra processing time to control a peripheral device by the relevant operating system because of the intervention of the hypervisor between hardware resources and the operating system. This is considered as a main cause of exposing the overhead of the hypervisor.

An object of the present invention is to provide a technique for reducing the hypervisor overhead.

The above-noted and other objects and novel features of the present invention will become apparent from the following description in the present specification and the accompanying drawings.

A typical aspect of the invention disclosed in this application is summarized as follows.

A data processor pertaining to an exemplary embodiment of the present invention comprises a processor equipped with interfaces via which peripheral devices can be coupled to the processor, a hypervisor for realizing a virtual machine on top of the processor, and a plurality of operating systems governed by the hypervisor. The peripheral devices are classified into dedicated controlled peripheral devices which are solely operable under a single operating system and application programs to be run under control of the operating system and shared controlled peripheral devices which are operable under the operating systems and application programs to be run under control of these operating systems. A set of registers is provided in which data can be set to implement control of one of the shared controlled peripheral devices by an operating system that controls the execution of an application program relevant to processing of that control via processing by the hypervisor and to implement control of one of the dedicated controlled peripheral devices by an operating system that controls the execution of an application program relevant to processing of that control without intervention of processing by the hypervisor. Control of the dedicated controlled peripheral device can be performed by an operating system that controls the execution of an application program relevant to processing of that control without intervention of processing by the hypervisor. By implementing this manner of control, it becomes possible to carry out peripheral device control without intervention of processing by the hypervisor. This achieves a reduction in the hypervisor overhead.

Effect obtained by a typical aspect of the invention disclosed herein is outlined below.

It is thus possible to reduce the hypervisor overhead.

BRIEF DESCRIPTION OF THE DRAWINGS

FIG. 4 illustrates an XVS transition instruction setting register included in the processor;

FIG. 6 illustrates an XVS transition control register segment setting register, an XVS transition control coarse granularity address segment setting register, and an XVS transition control fine granularity address segment setting register;

FIG. 9 illustrates concrete examples of transition XVS registers included in the interrupt controller; and FIG. 10 illustrates registers for specifying whether or not an SRX register should be used to handle each interrupt source.

DETAILED DESCRIPTION OF THE PREFERRED EMBODIMENTS

1. Summary of the Preferred Embodiments

Figure 1:
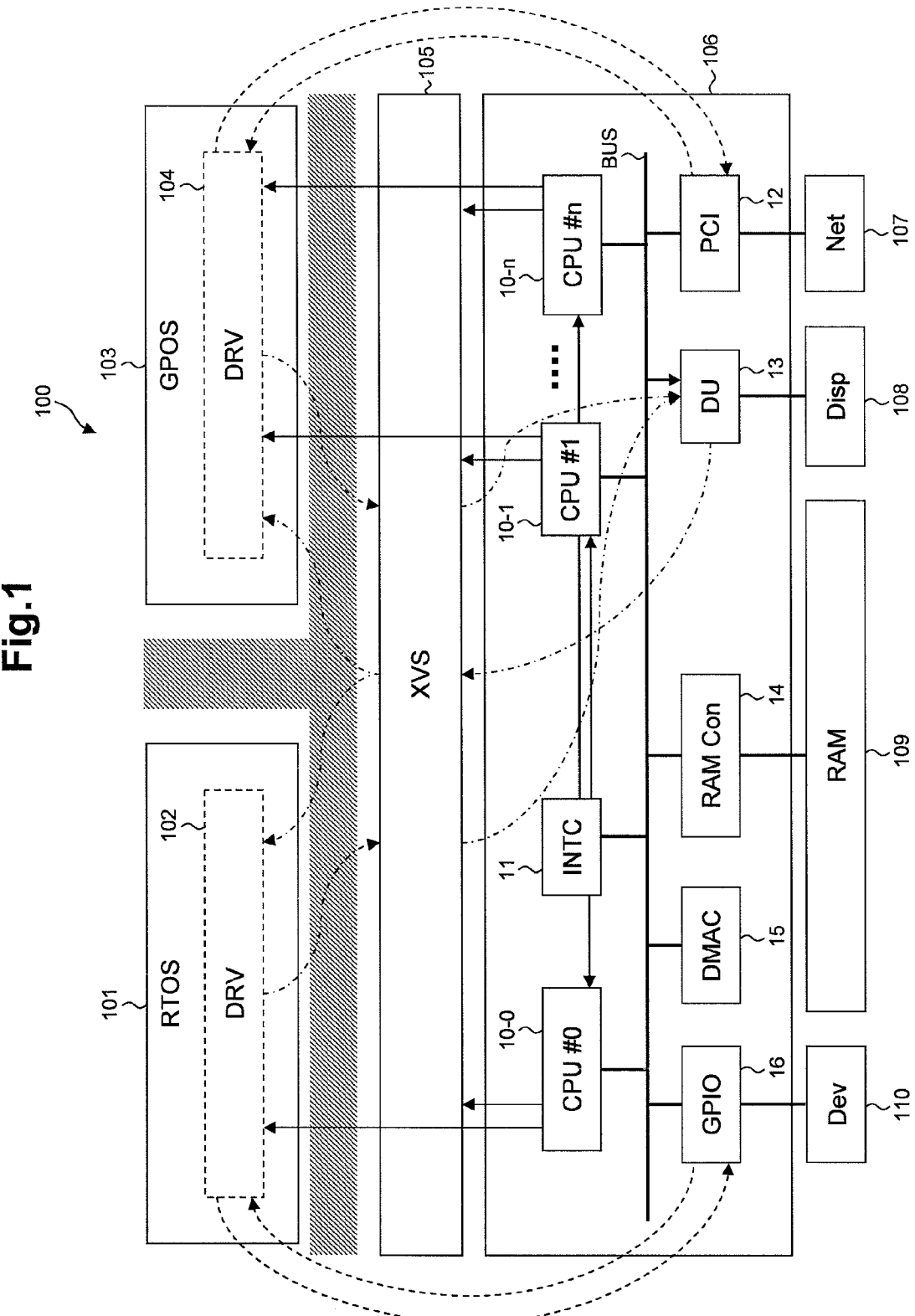
FIG. 1 is a block diagram of a configuration example of a data processor pertaining to the present invention.

To begin with, exemplary embodiments of the present invention disclosed herein are outlined. In the following general description of exemplary embodiments, reference designators (numerals) in the drawings, which are given for referential purposes in parentheses, are only illustrative of elements that fall in the concepts of the components identified by the designators.

[1] A data processor (100) pertaining to an exemplary embodiment of the present invention comprises a processor (106), equipped with interfaces via which peripheral devices (107, 108, 110) can be coupled to the processor, a hypervisor 105 for realizing a virtual machine on top of the processor, and a plurality of operating systems (101, 103) governed by the hypervisor.

The peripheral devices are classified into dedicated controlled peripheral devices (716) which are solely operable under a single operating system and application programs to be run under control of the operating system and shared controlled peripheral devices (715) which are operable under the operating systems and application programs to be run under control of these operating systems. Control of one of the shared controlled peripheral devices is implemented by an operating system that controls the execution of an application program relevant to processing of that control via processing by the hypervisor, whereas control of one of the dedicated controlled peripheral devices is implemented by an operating system that controls the execution of an application program relevant to processing of that control without intervention of processing by the hypervisor. A set of registers (17) is provided in which data for implementing the above manner of control can be set.

In the data processor, when a device driver calls for access to a control register 18 to activate a process of a dedicated controlled peripheral device, the access is handled directly without intervention of processing by the hypervisor. When an interrupt is generated from a dedicated controlled peripheral device, a process is directly initiated by the device driver of the operating system governing the peripheral device without intervention of processing by the hypervisor. By implementing this manner of control in the processor, it becomes possible to carry out peripheral device control without intervention of processing by the hypervisor in a built-in system in which a majority of peripheral devices are dedicated controlled ones. Thereby, the overhead of the hypervisor is alleviated.

Optimization of performance of the data processor also becomes feasible, because the processing time of the processor is reduced by dispensing with processing by the hypervisor, which can be done as described above.

[2] In the data processor as set forth in [1], when the processor interacts with a dedicated controlled peripheral device, no exception is generated by access to one of control registers (18) for the peripheral device by one of the operating systems. When the processor interacts with a shared controlled peripheral device, an exception is generated by access to one of control registers (18) for the peripheral device by one of the operating systems and the processor activates a control program for the shared controlled peripheral device within the hypervisor. By thus configuring the data processor, a noticeable effect of reducing the overhead of the hypervisor is achieved.

[3] The data processor as set forth in [2] can be configured such that, in the case of interaction with a dedicated controlled peripheral device, a program execution by the processor is caused to transit into the execution of a control program related to the peripheral device by an operating system that governs the peripheral device, and, in the case of interaction with a shared controlled peripheral device, the program execution by the processor is caused to transit into the execution of a control program related to the peripheral device within the hypervisor.

[4] The data processor as set forth in [1] can be configured such that, when a privileged instruction is used to control a peripheral device under control of an operating system, in the case of interaction with a dedicated controlled peripheral device, no exception is generated by executing the privileged instruction for the peripheral device by the operating system. In the case of interaction with a shared controlled peripheral device, an exception is generated by executing the privileged instruction for the peripheral device by the operating system and a control program for the shared controlled peripheral device within the hypervisor is activated.

[5] In the data processor as set forth in [2], control registers (18) are allocated to continuous segments of an area in a physical address space.

The set of registers may include transition control address segment setting registers (XVSTRSCAB, XVSTRSFAB) which specify whether or not an exception is generated by access to a segment in which control data for one of the peripheral devices is stored.

[6] In the data processor as set forth in [2], in order to allocate the control registers (5) exactly, the control registers may preferably be allocated to segments in the physical address space, wherein the size of each segment is equal to a value that is raised to the power of 2 and a segment start address is set to a multiple of the size value.

[7] In the data processor as set forth in [2], the set of registers may include segment setting registers which can specify, for each of pre-assigned address segments of address areas to which system registers including the control registers

(18) for the peripheral devices are allocated, whether access to the segment is hooked area access or non-hooked area access. The segment setting registers may include a transition control coarse granularity address segment setting register (XVSTRSCAB), a transition control register segment setting register (XVSTRSCRB), and a transition control fine granularity address segment setting register (XVSTRSFAB).

[8] In the data processor as set forth in [1], a control program for performing control of a peripheral device under control of one of the operating systems is activated by an interrupt signal generated by the peripheral device. The data processor can be provided therein with an interrupt control unit (11) in which data can be specified to implement that: if an interrupt is requested by a dedicated controlled peripheral device, a control program for performing control of the peripheral device by one of the operating systems is activated; or if an interrupt is requested by a shared controlled peripheral device, a control program for performing control of the peripheral device by the hypervisor is activated.

[9] In the data processor as set forth in [8], in order to easily configure the interrupt control unit having the above function, the interrupt control unit may preferably be provided with a transition XVS register (CnXVS2TRX, CnXVS2TRX) in which it can be specified whether a control program by one of the operating systems or a control program by the hypervisor should be activated by an interrupt signal generated by peripheral processing in one of the peripheral devices.

[10] In the data processor as set forth in [9], the processor may include central processing units. In this case, each of the central processing units may include a first status register (SR) having a bit or bits for controlling whether or not the processor execution is to transit into interrupt processing depending on an interrupt level and a bit or bits for controlling whether or not the processor execution is to transit into interrupt processing depending on an interrupt. Each of the central processing units may further include a second status register (SRX) having a bit or bits for controlling whether or not the processor execution is to transit into interrupt processing depending on an interrupt level and a bit or bits for controlling whether or not the processor execution is to transit into interrupt processing depending on an interrupt.

[11] In the data processor as set forth in [8], in order to easily configure the interrupt control unit having the above function, the interrupt control unit may include an insensitive register (CnXVSSRI, CnXVS2SRI) for specifying whether the first status register or the second status register should be used, according to the setting specified in which register, control is performed as to whether or not to make a transition of the processor execution when an interrupt occurs.

2. Further Details Description of the Preferred Embodiments

Embodiments of the invention will now be described in greater detail.

First Embodiment

FIG. 1 shows a configuration example of a data processor pertaining to the present invention.

The data processor 100 shown in FIG. 1 includes a multi-core SoC (System-on-a-Chip) processor (which will be simply referred to as a "processor" hereinafter) 106. The above processor 106 includes a plurality of central processing units (CPU #0, CPU #1, . . . , CPU #n) 10-0, 10-1, . . . , 10-n. The processor 106 further includes an interrupt control unit (INTC) 11, a PCI (Peripheral Component Interconnect) unit (PCI) 12, a display control unit (DU) 13, an external memory control unit (RAM Con) 14, a DMAC (Direct Memory Access Controller) 15, and a general-purpose I/O control unit (GPIO) 16. Such processor is formed in a single semiconductor substrate such as a monocrystalline silicon substrate by means of a publicly known semiconductor integrated circuit manufacturing technology. The above CPUs 10-0, 10-1, . . . , 10-n, interrupt control unit 11, PCI unit 12, display control unit 13, external memory control unit 14, direct memory access controller (DMAC) 15, and general-purpose I/O control unit 16 are interconnected so that they can exchange signals with each other via an internal bus BUS. The CPUs 10-0, 10-1, . . . , 10-n execute predefined arithmetic processing according to a preconfigured program. The interrupt control unit 11 controls an interruption from a peripheral device and an internal module to the CPUs 10-0, 10-1, . . . , 10-n. The DMAC 15 performs data transfer at a high speed instead of the CPUs 10-0, 10-1, . . . , 10-n. A plurality of peripheral devices are coupled to the processor 106. The peripheral devices include, but not limited to, an external device (Dev) 110 coupled to the general-purpose I/O control unit 16, an external memory (RAM) 109 coupled to the external memory control unit (RAM Con) 14, a display device (Disp) 108 coupled to the display control unit 13, a network control device (Net) 107 coupled to the PCI unit 12, etc. Further, a virtualization technology is applied to the data processor 100: i.e., the data processor 100 incorporates therein a general-purpose operating system (GPOS) for control 101 and a real-time operating system (RTOS) for data processing 103 on top of the hardware of the data processor 100 via a hypervisor (XVS) 105. The hypervisor 105 is a control program for realizing a virtual machine on top of the hardware (processor). The above operating system for control 101 and operating system for data processing 103 are under the control of the hypervisor 105. The operating system for control 101 includes a device driver (DRV) 102, whereas the operating system for data processing 103 includes a device driver (DRV) 104. The device drivers 102, 104 are considered as software for controlling a particular input/output device and providing an abstraction level interface to application software.

Figure 3:
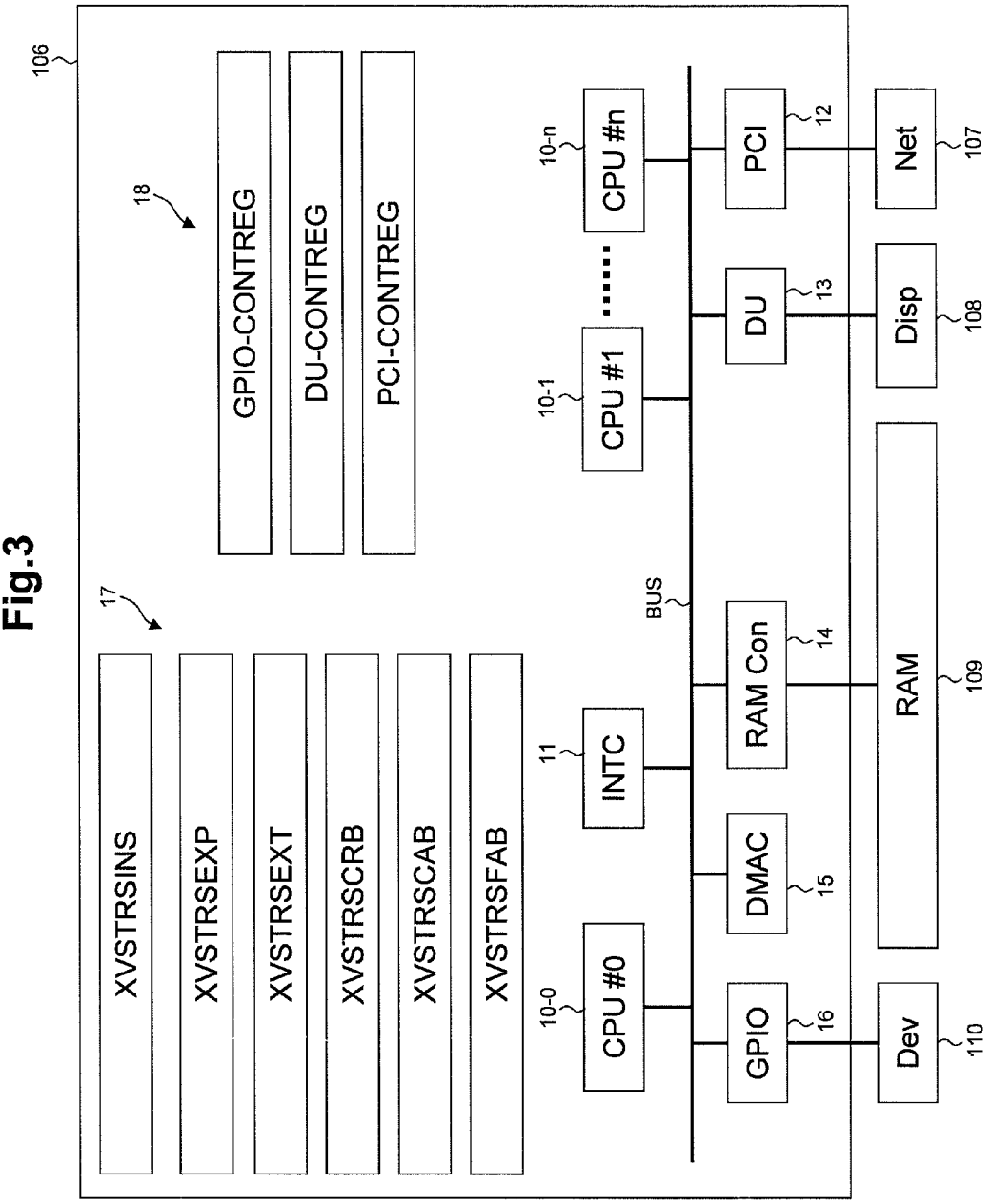
FIG. 3 illustrates a set of registers for specifying which operation mode to go into for each event that triggers a transition of the operation mode of the CPU and control registers for peripheral devices.

As is shown in FIG. 3, the following registers are disposed within the processor 106: a set of registers 17 for specifying which operation mode to go into for each event that triggers a transition of operation mode of the CPU 10-0, 10-1, . . . , 10-n and control registers 18 for the peripheral devices. Detailed description hereof will be provided later.

Here, let us consider a case where the hypervisor situated between the hardware resources and the operating systems performs an arbitration between the operating systems with respect to the hardware resources. In order that an operating system exerts control of a peripheral device, when its device driver calls for access to a control register 18 or invokes a privileged instruction to activate a process of the peripheral device, the processor generates an exception before handling the access or starting to execute the privileged instruction and transfers the processing control to a processing program of the hypervisor for implementing an arbitration for access to the peripheral device. After the hypervisor processing with regard to the access arbitration, the processor proceeds to handling the access to the control register 18 or executing the privileged instruction before the exception generated, as requested by the device driver that implements control of the peripheral device in the operating system. On the other hand, upon completion of the process activated to the peripheral device, the peripheral device generates an interrupt, causing the transfer of the processing run control of the processor to the hypervisor process execution. After an arbitration between the operating systems has been performed, a process is initiated by the device driver of the operating system that activated the process to the peripheral device. Therefore, it takes extra processing time to control a peripheral device by the relevant operating system because of the intervention of the hypervisor between the hardware resources and the operating systems.

In view hereof, the data processor 100 shown in FIG. 1 is arranged as follows. Taking notice of a point that most of peripheral devices in a built-in system are solely controlled by a specific operating system, the peripheral devices are classified into two categories: shared controlled peripheral devices which are under shared control of multiple operating systems and dedicated controlled peripheral devices which are under dedicated control of a specific operating system. Processing suitable for peripheral devices of each category is performed. For example, the external device 110 is classified as a dedicated controlled peripheral device under dedicated control of the operating system for control 101. The network control device 107 is classed as a dedicated controlled peripheral device under dedicated control of the operating system for data processing 103. The display control unit 108 is classified as a shared controlled peripheral device under shared control of the operating system for control 101 and the operating system for data processing 103. The virtualization technology is effectively used for the shared controlled peripheral device (108). The hypervisor 105 that intervenes between the shared controlled peripheral device (108) and the operating systems 101, 103 performs an arbitration task with respect to access from the operating systems 101, 103. On the other hand, since the dedicated controlled peripheral devices (107, 110) are solely controlled by a specific operating system, there is no need for access arbitration processing between the operating systems 101, 103.

Accordingly, in the data processor 100 shown in FIG. 1, when a device driver calls for access to a control register 18 to activate a process of a dedicated controlled peripheral device (107, 110), the access is handled directly without intervention of processing by the hypervisor 105. When an interrupt is generated from a dedicated controlled peripheral device (107, 110), a process is directly initiated by the device driver of the operating system governing the peripheral device without intervention of processing by the hypervisor 105. By implementing this manner of control in the processor 106, it becomes possible to carry out peripheral device control without intervention of processing by the hypervisor 105 in a built-in system in which a majority of peripheral devices are dedicated controlled ones and the overhead of the hypervisor 105 is alleviated. Thereby, performance optimization also becomes feasible by reduced processing time.

Figure 2:
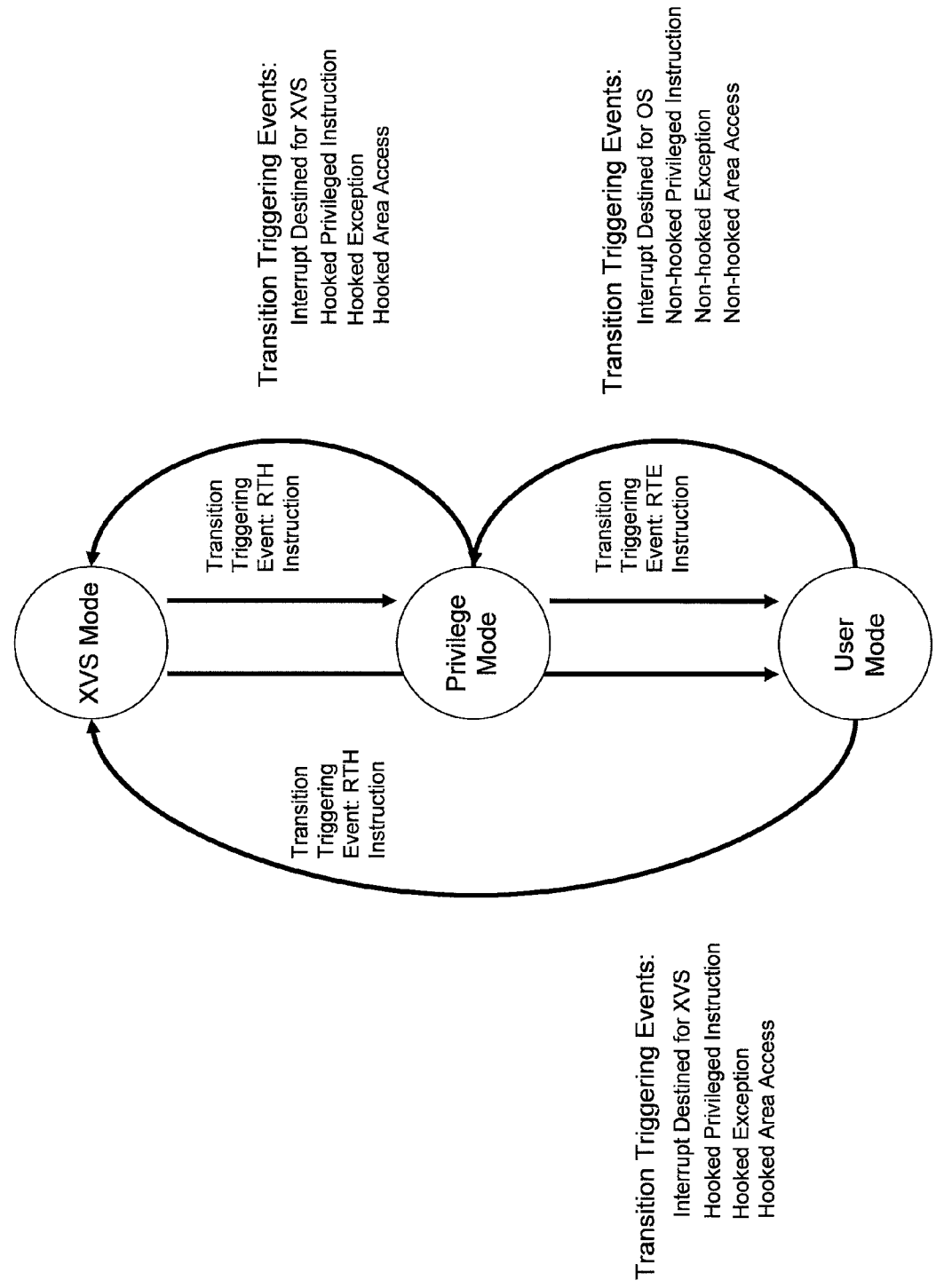
FIG. 2 illustrates operation modes in which the processor executes a program in the above data processor.

FIG. 2 illustrates operation modes in which the processor 106 executes a program in the data processor 100 shown in FIG. 1.

The processor 106 has three operation modes: hypervisor mode (XVS mode), privilege mode, and user mode. The user mode is an operation mode in which the CPU 10-0, 10-1, . . . , 10-$n$ executes instructions implementing an application program. The privilege mode is a mode in which the CPU executes instructions implementing one of the operating systems. The hypervisor mode (XVS mode) is a mode in which the CPU executes instructions implementing the hypervisor 105.

In the hypervisor mode, the CPU 10-0, 10-1, . . . , 10-$n$ is able to access all the hardware resources and execute all instructions. In the privilege mode, restrictions are imposed on the hardware resources that the CPU 10-0, 10-1, . . . , 10-$n$ is able to access and the instructions that the CPU is able to execute. In the user mode, the restrictions are stricter than in the privilege mode.

While the CPU 10-0, 10-1, . . . , 10-$n$ executes a program instruction in the user mode, when encountering an interrupt destined for OS (interrupt to one of the operating systems) or a non-hooked exception or a non-hooked privileged instruction or non-hooked area access, the operation mode transits to the privilege mode and the CPU starts to execute a program implementing one of the operating systems. While the CPU 10-0, 10-1, . . . , 10-$n$ executes a program instruction in the user mode, when encountering an interrupt destined for XVS (interrupt to the hypervisor) or a hooked exception or a hooked privileged instruction or hooked area access, the operation mode transits to the hypervisor mode (XVS mode) and the CPU starts to execute a program implementing the hypervisor 105.

While the CPU 10-0, 10-1, . . . , 10-$n$ executes a program instruction in the privilege mode, when encountering an interrupt destined for OS or a non-hooked exception or a non-hooked privileged instruction or non-hooked area access, the operation mode transits to the privilege mode and the CPU starts to execute program instructions implementing one of the operating systems.

While the CPU 10-0, 10-1, . . . , 10-$n$ executes a program instruction in the privilege mode, when encountering an interrupt destined for XVS or a hooked exception or a hooked privileged instruction or hooked area access, the operation mode transits to the hypervisor mode (XVS mode) and the CPU starts to execute a program implementing the hypervisor 105.

When the CPU 10-0, 10-1, . . . , 10-$n$ terminates processing of a program implementing one of the operating systems in the privilege mode, it executes a return instruction (RTE instruction) and changes the operation mode to the user mode. The CPU resumes the execution of an application program interrupted by an interrupt, an exception, a privileged instruction, non-hooked area access, or hooked area access.

When the CPU 10-0, 10-1, . . . , 10-$n$ terminates processing of a program implementing the hypervisor 105 in the hypervisor mode (XVS mode), it executes an RTE instruction and resumes the processing that was executed and interrupted immediately before starting to execute the program implementing the hypervisor 105 after the transition to the hypervisor mode (XVS mode). This processing includes executing a program implementing an application which was executed in the user mode or executing a program implementing an application which was executed in the user mode.

FIG. 3 illustrates a set of registers 17 and control registers 18 disposed within the processor 106. The set of registers 17 has a function of specifying which operation mode to go into for each event that triggers a transition of operation mode of the CPU 10-0, 10-1, . . . , 10-$n$. The set of registers 17 includes an XVS transition instruction setting register XVSTRSINS, an XVS transition exception setting register XVSTRSEXP, an XVS transition extended resource setting register XVSTRSEXT, an XVS transition control register segment setting register XVSTRSCRB, an XVS transition control coarse granularity address segment setting register XVSTRSCAB, and an XVS transition control fine granularity address segment setting register XVSTRSFAB.

The XVS transition instruction setting register XVSTRSINS specifies, for each privileged instruction, whether it is a hooked privileged instruction or a non-hooked privileged instruction. If a hooked privileged instruction is specified, the CPU 10-0, 10-1, . . . , 10-$n$ that executed the instruction changes the operation mode to the hypervisor mode (XVS mode). If a non-hooked privileged instruction is specified, the CPU 10-0, 10-1, . . . , 10-n that executed the instruction changes the operation mode to the privilege mode.

The XVS transition exception setting register XVSTR-SEXP specifies, for each exception event, whether it is a hooked exception or a non-hooked exception. If a hooked exception is specified, the CPU 10-0, 10-1, . . . , 10-n that generated the exception event changes the operation mode to the hypervisor mode (XVS) mode. If a non-hooked exception is specified, the CPU 10-0, 10-1, . . . , 10-n that generated the exception event changes the operation mode to the privilege mode.

With regard to access to resources such as system registers and areas added as extended functions for the multi-core SoC processor from a conventional single core processor, the XVS transition extended resource setting register XVSTRSEXT specifies whether access to one of the above resources is a hooked exception or a non-hooked exception. If a hooked exception is specified, the CPU (10-0, 10-1, . . . , 10-n) that performed the access changes the operation mode to the hypervisor mode (XVS) mode. If a non-hooked exception is specified, the CPU (10-0, 10-1, . . . , 10-n) that performed the access changes the operation mode to the privilege mode.

The XVS transition control register segment setting register XVSTRSCRB, XVS transition control coarse granularity address segment setting register XVSTRSCAB, and XVS transition control fine granularity address segment setting register XVSTRSFAB specify whether access to a pre-assigned address segment in an address area to where one of the control registers 18 for the peripheral devices and other system registers has been allocated is hooked area access or non-hooked area access. If hooked area access is specified, the CPU (10-0, 10-1, . . . , 10-n) that performed the access changes the operation mode to the hypervisor mode (XVS) mode. If non-hooked area access is specified, the CPU (10-0, 10-1, . . . , 10-n) that performed the access changes the operation mode to the privilege mode. Here, the XVS transition control register segment setting register XVSTRSCRB, XVS transition control coarse granularity address segment setting register XVSTRSCAB, and XVS transition control fine granularity address segment setting register XVSTRS-FAB are provided to be used, depending on the size of an assigned address segment and an address area of the address segment.

As shown in FIG. 3, the control registers 18 include a GPIO control register CPIO-CONT-REG for the general-purpose I/O control unit 16, a DU control register DU-CONTREG for the display control unit 13, and a PCI control register PCI-CONTREG for the PCI unit 12.

Figure 4:
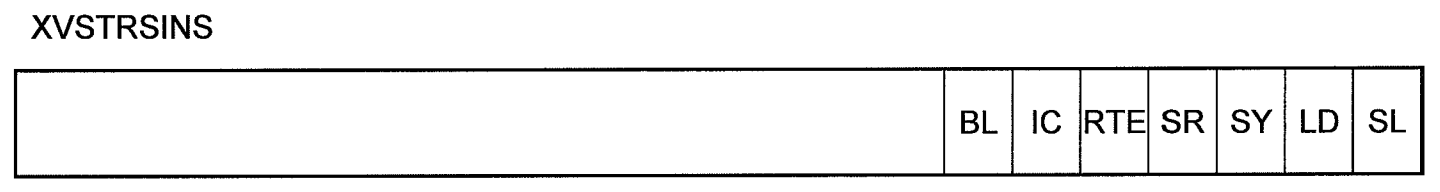

FIG. 4 illustrates a concrete example of the XVS transition instruction setting register XVSTRSINS.

When a privileged instruction is executed, data in the XVS transition instruction register specifies whether it is a hooked privileged instruction or a non-hooked privileged instruction. If a hooked privileged instruction is specified, the corresponding CPU 10-0, 10-1, . . . , 10-n transits into the hypervisor mode (XVS mode). If a non-hooked privileged instruction is specified, the corresponding CPU 10-0, 10-1, . . . , 10-n transits into the privilege mode.

Bits in the XVS transition instruction setting register XVSTRSINS have the following functions.

When a SLEEP instruction is executed, an SL bit specifies whether or not it is a hooked privileged instruction. When an LDTBL instruction is executed, an LD bit specifies whether or not it is a hooked privileged instruction. When a SYNCO instruction is executed, an SY bit specifies whether or not it is a hooked privileged instruction. When data is loaded or stored into an SR register by execution of an LDC instruction, STC instruction, LDC.L instruction, or STC.L instruction, an SR bit specifies whether or not it is the execution of a hooked privileged instruction. When an RTE instruction is executed, an RTE bit specifies whether or not it is a hooked privileged instruction. When an ICBI instruction is executed, an IC bit specifies whether or not it is a hooked privileged instruction. When SR and BL bits are changed by execution of a SETBL instruction or CLRBL instruction, a BL bit specifies whether or not it is the execution of a hooked privileged instruction.

Figure 5:
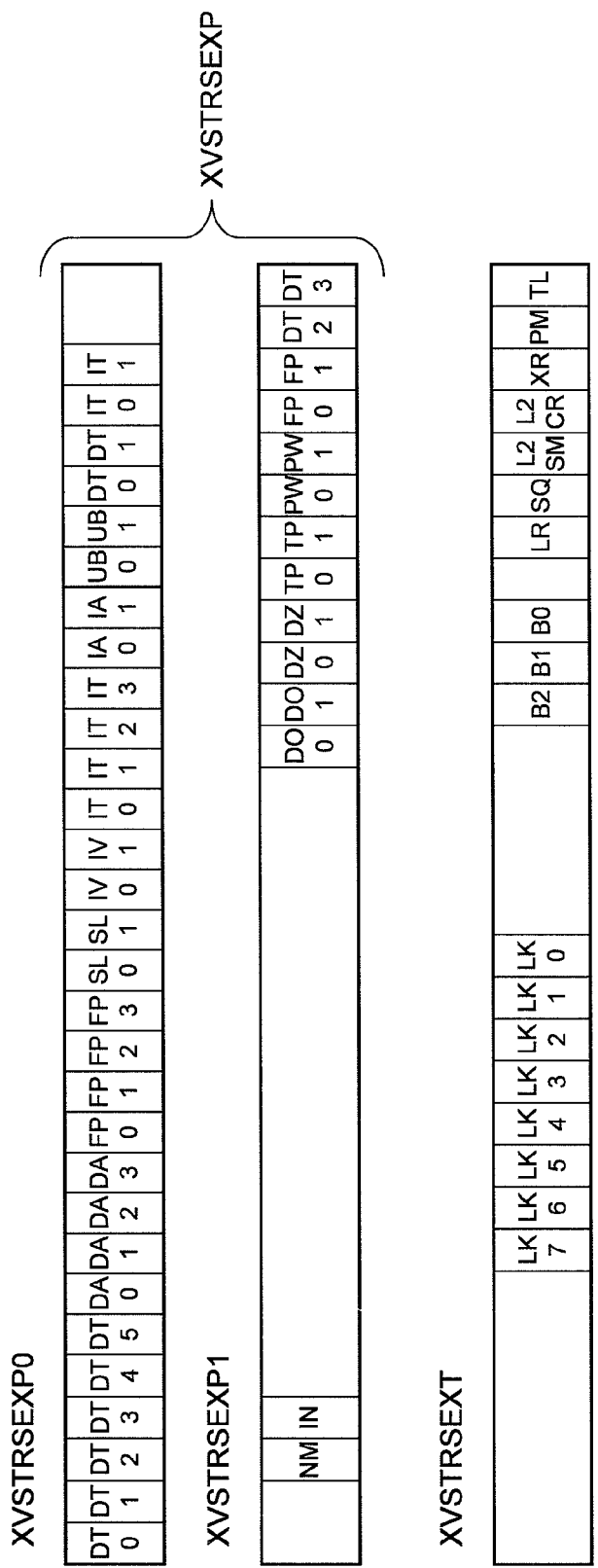
FIG. 5 illustrates concrete examples of an XVS transition exception setting register and an XVS transition extended resource setting register included in the processor.

FIG. 5 illustrates concrete examples of the XVS transition exception setting register XVSTRSEXP and the XVS transition extended resource setting register XVSTRSEXT. The XVS transition exception setting register XVSTRSEXP includes XVSTRSEXP0 and XVSTRSEXP1.

Bits in the XVS transition exception setting register XVSTRSEXP0 have the following functions.

A DT0 bit specifies whether or not DTLBPRP, a data TLB (Translation Look-aside Buffer) protection violation (read) exception in the privilege mode is an hooked exception. A DT1 bit specifies whether or not DTLBPRU, a data TLB protection violation (read) exception in the user mode is an hooked exception. A DT2 bit specifies whether or not DTLB-MWP, a data TLB miss (write) exception in the privilege mode is a hooked exception. A DT3 bit specifies whether or not DTLBMWU, a data TLB miss (write) exception in the user mode is a hooked exception. A DT4 bit specifies whether or DTLBMRP, a data TLB miss (read) exception in the privilege mode is a hooked exception. A DT5 bit specifies whether or DTLBMRU, a data TLB miss (read) exception in the user mode is a hooked exception. A DA0 bit specifies whether or not DAERRWP, a data address error (write) exception in the privilege mode is a hooked exception. A DA1 bit specifies whether or not DAERRWU, a data address error (write) exception in the user mode is a hooked exception. A DA2 bit specifies whether or not DAERRRP, a data address error (read) exception in the privilege mode is a hooked exception. A DA3 bit specifies whether or not DAERRRU, a data address error (read) exception in the user mode is a hooked exception. An FP0 bit specifies whether or not FPMSLTP, a slot FPU masking exception in the privilege mode is a hooked exception. An FP1 bit specifies whether or not FPMSLTU, a slot FPU masking exception in the user mode is a hooked exception. An FP2 bit specifies whether or not FPUMSKP, an FPU masking exception in the privilege mode is a hooked exception. An FP3 bit specifies whether or not FPUMSKU, an FPU masking exception in the user mode is a hooked exception. An SL0 bit specifies whether or not INVSLTP, an invalid slot exception in the privilege mode is a hooked exception. An SL1 bit specifies whether or not INVSLTU, an invalid slot exception in the user mode is a hooked exception. An IV0 bit specifies whether or not INVINSP, a general invalid instruction exception in the privilege mode is a hooked exception. An IV1 bit specifies whether or not INVINSU, a general invalid instruction exception in the user mode is a hooked exception. An IT0 bit specifies whether or not ITLBPRP, an instruction TLB protection exception in the privilege mode is a hooked exception. An IT1 bit specifies whether or not ITLBPRU, an instruction TLB protection exception in the user mode is a hooked exception. An IT2 bit specifies whether or not ITLBMSP, an instruction TLB miss exception in the privilege mode is a hooked exception. An IT3 bit specifies whether or not ITLBMSU, an instruction TLB miss exception in the user mode is a hooked exception. An IA0 bit specifies whether or not IAERRP, an instruction address error exception in the privilege mode is a hooked exception. An IA1 bit specifies whether or not IAERRU, an instruction address error exception in the user mode is a hooked exception. A UB0 bit specifies whether or not UBRKP, a user break exception in the privilege mode is a hooked exception. A UB1 bit specifies whether or not UBRKU, a user break exception in the user mode is a hooked exception. A DT0 bit specifies whether or not DTLBMHP, a data TLB multi-hit exception in the privilege mode is a hooked exception. A DT1 bit specifies whether or not DTLBMHU, a data TLB multi-hit exception in the user mode is a hooked exception. An IT0 bit specifies whether or not DTLBMHP, an instruction TLB multi-hit error in the privilege mode is a hooked exception. An IT1 bit specifies whether or not DTLBMHU, an instruction TLB multi-hit error in the user mode is a hooked exception.

Bits in the XVS transition exception setting register XVSTRSEXP1 have the following functions.

An NM bit specifies whether or not NMIH, a non-maskable interrupt is a hooked exception. An IN bit specifies whether or not INTH, a general interrupt is a hooked exception. A DO0 bit specifies whether or not DIVOFP, an integer division (overflow) exception in the privilege mode is a hooked exception. A DO1 bit specifies whether or not DIVOFU, an integer division (overflow) exception in the user mode is a hooked exception. A DZ0 bit specifies whether or not DIVZRP, an integer division (divided by zero) exception in the privilege mode is a hooked exception. A DZ1 bit specifies whether or not DIVZRU, an integer division (divided by zero) exception in the user mode is a hooked exception. A TP0 bit specifies whether or not TRAPAP, an unconditional trap exception in the privilege mode is a hooked exception. A TP1 bit specifies whether or not TRAPAU, an unconditional trap exception in the user mode is a hooked exception. A PW0 bit specifies whether or not DINIPWP, an initial page write exception in the privilege mode is a hooked exception. A PW1 bit specifies whether or not DINIPWU, an initial page write exception in the user mode is a hooked exception. An FP0 bit specifies whether or not FPUEXPP, an FPU exception in the privilege mode is a hooked exception. An FP1 bit specifies whether or not FPUEXPU, an FPU exception in the user mode is a hooked exception. A DT2 bit specifies whether or not DTLBPWP, a data TLB protection violation (write) in the privilege mode is a hooked exception. A DT3 bit specifies whether or not DTLBPWP, a data TLB protection violation (write) in the user mode is a hooked exception.

Bits in the XVS transition extended resource setting register XVSTRSEXT have the following functions.

An LK0 bit specifies whether or not LCK7, access to lock synchronization registers of numbers 224 thru 255 is hooked area access. An LK1 bit specifies whether or not LCK6, access to lock synchronization registers of numbers 192 thru 223 is hooked area access. An LK2 bit specifies whether or not LCK5, access to lock synchronization registers of numbers 160 thru 191 is hooked area access. An LK3 bit specifies whether or not LCK4, access to lock synchronization registers of numbers 128 thru 159 is hooked area access. An LK4 bit specifies whether or not LCK3, access to lock synchronization registers of numbers 96 thru 127 is hooked area access. An LK5 bit specifies whether or not LCK2, access to lock synchronization registers of numbers 64 thru 95 is hooked area access. An LK6 bit specifies whether or not LCK1, access to lock synchronization registers of numbers 32 thru 63 is hooked area access. An LK7 bit specifies whether or not LCK0, access to lock synchronization registers of numbers 0 thru 31 is hooked area access. A B2 bit specifies whether or not BAR2, access to barrier synchronization registers (BARR2, BARW2) is hooked area access. A B1 bit specifies whether or not BAR1, access to barrier synchronization registers (BARR1, BARW1) is hooked area access. A B0 bit specifies whether or not BAR0, access to barrier synchronization registers (BARR0, BARW0) is hooked area access. An LR bit specifies whether or not LRAM, access to LRAM is hooked area access. An SQ bit specifies whether or not SQ, access to a store queue (SQ) is hooked area access. An L2SM bit specifies whether or not access to an L2 cache for a shared memory is hooked area access. An L2CR bit specifies whether or not access to an L2 cache control register is hooked area access. An XR bit specifies whether or not access to XVSRAM, an XVS dedicated memory is hooked area access. A PM bit specifies whether or not PMB, access to a PMB array is hooked area access. A TL bit specifies whether or not TLB, access to an ITLB/UTLB array is hooked area access.

Figure 6:
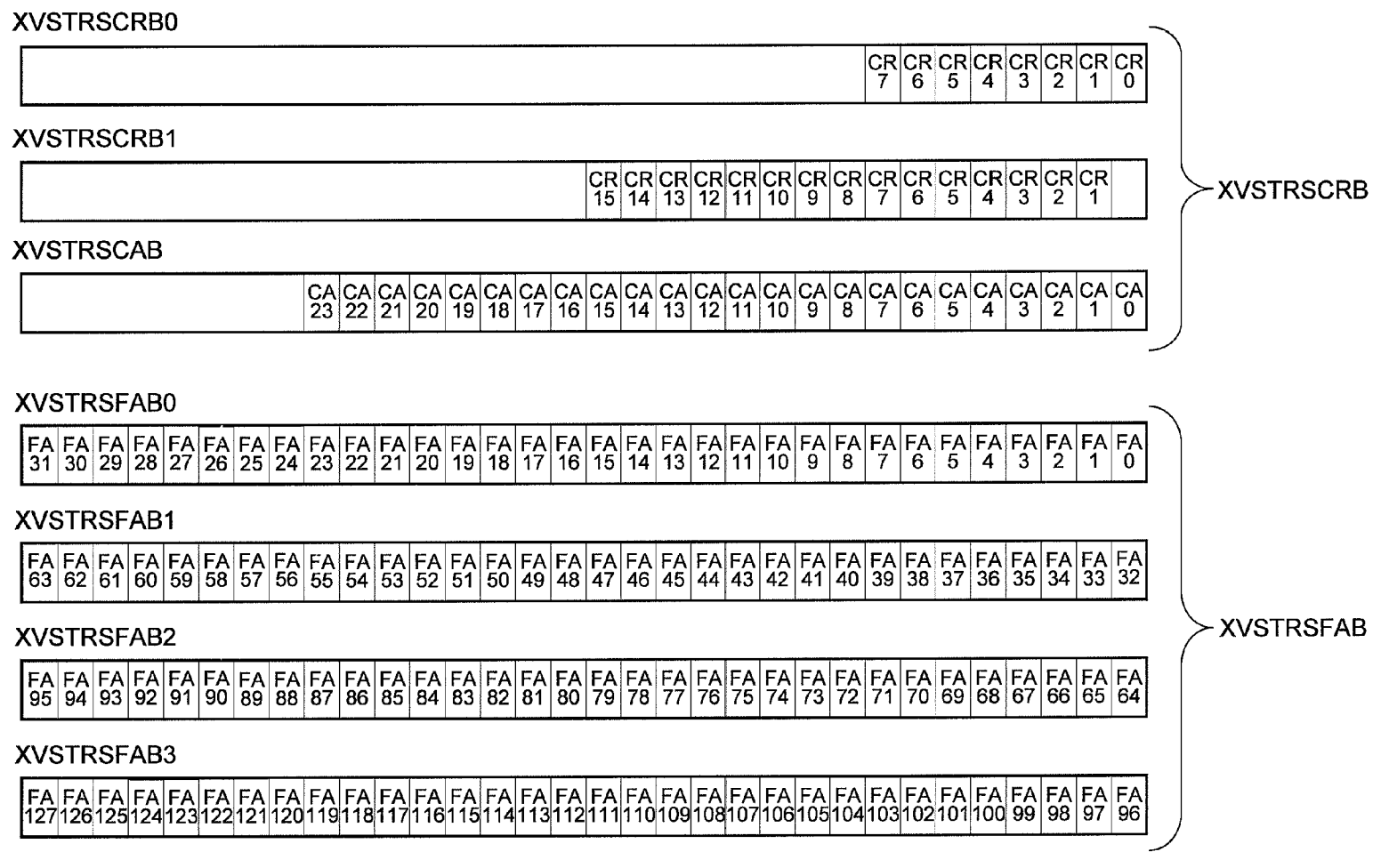

FIG. 6 illustrates concrete examples of the XVS transition control register segment setting register XVSTRSCRB, XVS transition control coarse granularity address segment setting register XVSTRSCAB, and XVS transition control fine granularity address segment setting register XVSTRSFAB.

The XVS transition control register segment setting register XVSTRSCRB includes XVSTRSCRB0 and XVSTRSCRB1.

In mapping the control registers for individual peripheral devices into a physical address space, the XVS transition control register segment setting register XVSTRSCRB0 allocates a register element that falls within an area of a size up to H'10 to a segment of an area from H'FF00_0000 to H'FF00_007F and specifies whether access to each segment of H'10 is hooked area access or non-hooked area access. More specifically, in the XVS transition control register segment setting register XVSTRSCRB0, a CR7 bit specifies whether access to a segment with physical addresses from H'FF00_0070 to H'FF00_007F is hooked area access or non-hooked area access. A CR6 bit specifies whether access to a segment with physical addresses from H'FF00_0060 to H'FF00_006F is hooked area access or non-hooked area access. Likewise, each of other bits CR5 thru CR1 specifies whether access to each address segment of H'10 is hooked area access or non-hooked area access. A CR0 bit specifies whether access to a segment with physical addresses from H'FF00_0000 to H'FF00_000F is hooked area access or non-hooked area access.

In mapping the control registers 18 for individual peripheral devices into the physical address space, the XVS transition control register segment setting register XVSTRSCRB1 allocates a register element that falls within an area of a size up to H'100 to a segment of an area from H'FF00_0100 to H'FF00_0FFF and specifies whether access to each segment of H'100 is hooked area access or non-hooked area access. More specifically, in the XVS transition control register segment setting register XVSTRSCRB1, a CR15 bits specifies whether access to a segment with physical addresses from H'FF00_0F00 to H'FF00_0FFF is hooked area access or non-hooked area access. A CR14 bit specifies whether access to a segment with physical addresses from H'FF00_0E00 to H'FF00_0EFF is hooked area access or non-hooked area access. Likewise, each of other bits CR13 thru CR2 specifies whether access to each address segment of H'100 is hooked area access or non-hooked area access. A CR1 bit specifies whether access to a segment with physical addresses from H'FF00_0100 to H'FF00_01FF is hooked area access or non-hooked area access. In this way, the control registers (elements) for individual peripheral devices are allocated to segments in the physical address space, wherein the size of each segment is equal to a value that is raised to the power of 2.

In mapping the control registers 18 for individual peripheral devices into the physical address space, the XVS transition control coarse granularity address segment setting register XVSTRSCAB allocates one that falls within an area of a size up to H'20_0000 to a segment in an area from H'FC00_0000 to H' FEFF_FFFF and specifies whether access to each segment of H'20_0000 is hooked area access or non-hooked area access. In particular, in the XVS transition control coarse granularity address segment setting register XVSTRSCAB, a CA23 bit specifies whether access to a segment with physical addresses from H'FEE0_0000 to H'FEFF_FFFF is hooked area access or non-hooked area access. A CA22 bit specifies whether access to a segment with physical addresses from H'FEC0_0000 to H'FEDF_FFFF is hooked area access or non-hooked area access. Likewise, each of other bits CA21 thru CA1 specifies whether access to each address segment of H'20_0000 is hooked area access or non-hooked area access. A CA0 bit specifies whether access to a segment with physical addresses from H'FC00_0000 to H'FC1F_FFFF is hooked area access or non-hooked area access.

The XVS transition control fine granularity address segment setting register XVSTRSFAB includes XVSTRSFAB0, XVSTRSFAB1, XVSTRSFAB2, and XVSTRSFAB3. In mapping the control registers 18 for individual peripheral devices into the physical address space, the XVS transition control fine granularity address segment setting registers XVSTRSFAB0, XVSTRSFAB1, XVSTRSFAB2, and XVSTRSFAB3 allocate a register element that falls within an area of a size up to H'2000 to a segment of an area from H'FF00_0000 to H'FFFF_FFFF. These registers specify whether access to each segment of H'2000 is hooked area access or non-hooked area access. In particular, the XVS transition control fine granularity address segment setting register 0 (XVSTRSFAB0) specifies whether access to each segment of H'2000 within an area from H'FF00_0000 to H'FF3F_FFFF is hooked area access or non-hooked area access. FA31 is used for the above specification regarding an area from H'FF3E_0000 to H'FF3F_FFFF. Other bits are used in order for the above specification and, finally, FA0 does the above specification regarding an area from H' FF00_0000 to H'FF01_FFFF. Similarly, the XVS transition control fine granularity address segment setting register XVSTRSFAB1 specifies whether access to each segment of H'2000H within an area from H'FF40_0000 to H'FF7F_FFFF is hooked area access or non-hooked area access. FA63 is used for the above specification regarding an area from H'FF7E_0000 to H'FF7F_FFFF. Other bits are used in order for the above specification and, finally, FA32 does the above specification regarding an area from H'FF40_0000 to H'FF41_FFFF. Similarly, the XVS transition control fine granularity address segment setting register XVSTRSFAB2 specifies whether access to each segment of H'2000H within an area from H'FF80_0000 to H'FFBF_FFFF is hooked area access or non-hooked area access. FA95 is used for the above specification regarding an area from H'FFBE_0000 to H'FFBF_FFFF. Other bits are used in order for the above specification and, finally, FA64 does the above specification regarding an area from H'FF80_0000 to H'FF81_FFFF. Similarly, the XVS transition control fine granularity address segment setting register XVSTRSFAB3 specifies whether access to each segment of H'2000H within an area from H'FFC0_0000 to H'FFFF_FFFF is hooked area access or non-hooked area access. FA127 is used for the above specification regarding an area from H'FFFE_0000 to H'FFFF_FFFF. Other bits are used in order for the above specification and, finally, FA96 does the above specification regarding an area from H'FFC0_0000 to H'FFC1_FFFF.

Figure 7:
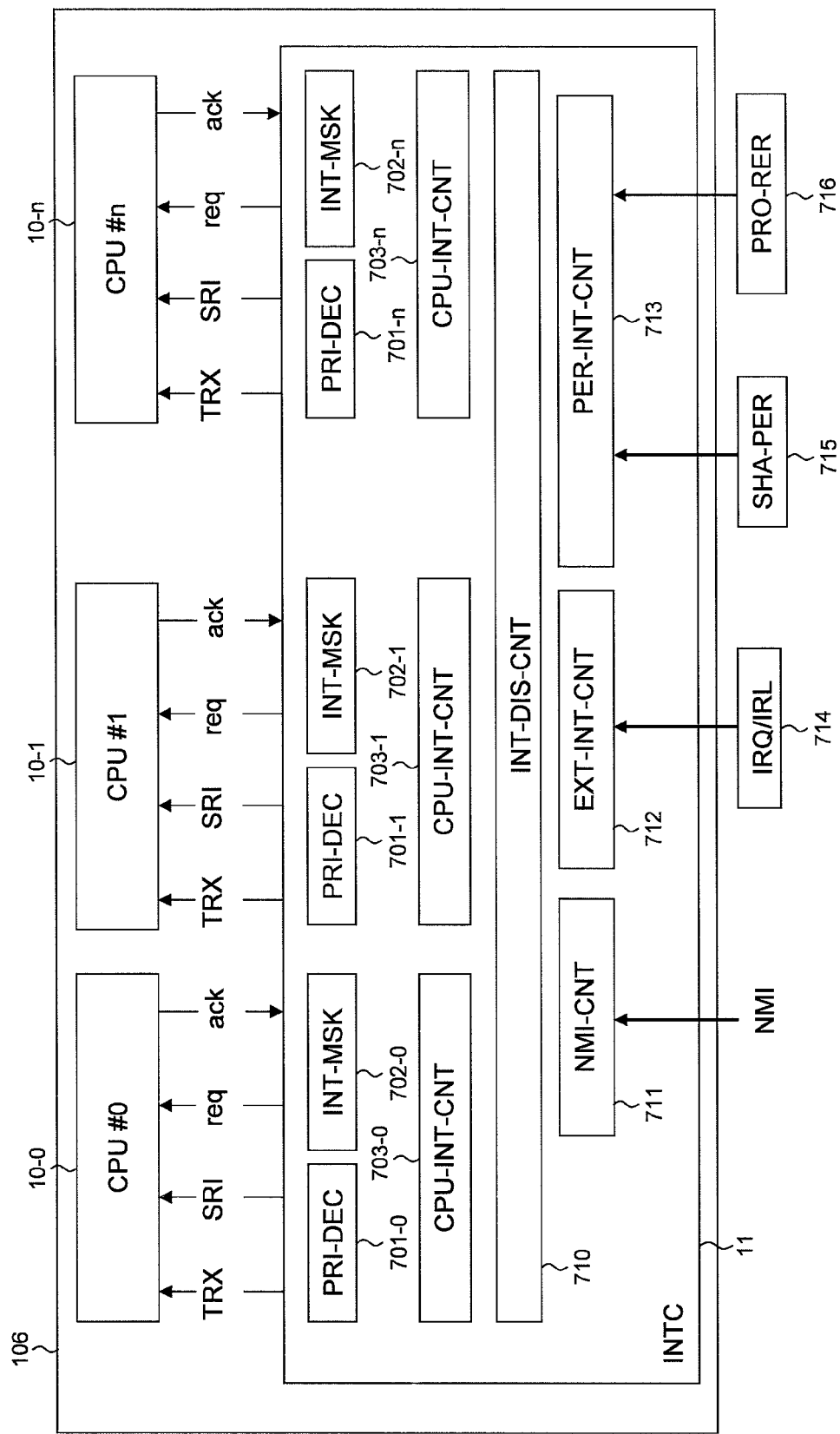
FIG. 7 is a block diagram of a configuration example of an interrupt controller included in the processor.

FIG. 7 shows a configuration example of the interrupt control unit 11.

Interrupt sources are typically an NMI (non-maskable interrupt), an external terminal (IRQ/IRL) interrupt, a built-in peripheral device interrupt, and an inter-CPU interrupt. In the interrupt control unit 11, to deal with these interrupt sources, an NMI controller (NMI-CNT) 711, an external terminal interrupt controller (EXT-INT-CNT) 712, a built-in peripheral device interrupt controller (PER-INT-CNT) 713, and inter-CPU interrupt controllers (CPU-INT-CNT) 703-0, 703-1, ..., 703-$n$ are provided. In association with the CPUs 10-0, 10-1, ..., 10-$n$, priority decision circuits (PRI-DEC) 701-0, 701-1, ..., 701-$n$ and interrupt mask circuits (NIT-MSK) 702-0, 702-1, ..., 702-$n$ are disposed. Further, an interrupt distribution controller (INT-DIS-CNT) 710 is provided. The priority decision circuits 701-0, 701-1, ..., 701-$n$ decide an order of priority of interrupt requests. The interrupt mask circuits 702-0, 702-1, ..., 702-$n$ mask a new interrupt request, if their corresponding CPU 10-0, 10-1, ..., 10-$n$ is engaged in interrupt processing. The interrupt sources are distributed by the interrupt distribution controller 710 to the priority decision circuits 701-0, 701-1, ..., 701-$n$ and the interrupt mask circuits 702-0, 702-1, ..., 702-$n$.

An interrupt request is handled according to the priority orders of interrupt sources and priority source masks set by a register per CPU. Depending on the result, an interrupt request signal (req) toward the relevant CPU 10-0, 10-1, ..., 10-$n$ is asserted. When the interrupt is accepted by any CPU 10-0, 10-1, ..., 10-$n$, an acceptance signal (ack) to the interrupt control unit 11 is asserted by the CPU. In this processor 106, furthermore, signals (TRX, SRI) indicating whether or not an interrupt requires transition to the XVS mode are transmitted to the CPUs 10-0, 10-1, ..., 10-$n$.

A signal TRX indicating whether or not an interrupt requires transition to the XVS mode specifies an operation mode into which the CPU 10-0, 10-1, ..., 10-$n$ transits after accepting the interrupt. For example, if the CPU 10-0, 10-1, ..., 10-$n$ accepts an interrupt request with TRX==1 (representing that TRX has a logical value of "1"), it transits into the hypervisor (XVS mode) in order to activate execution of a program implementing the hypervisor 105. On the other hand, if the CPU 10-0, 10-1, ..., 10-$n$ accepts an interrupt request with TRX==0 (representing that TRX has a logical value of "0"), it transits into the privilege mode in order to make one of the operating systems 101, 103 process the interrupt directly.

Figure 8:
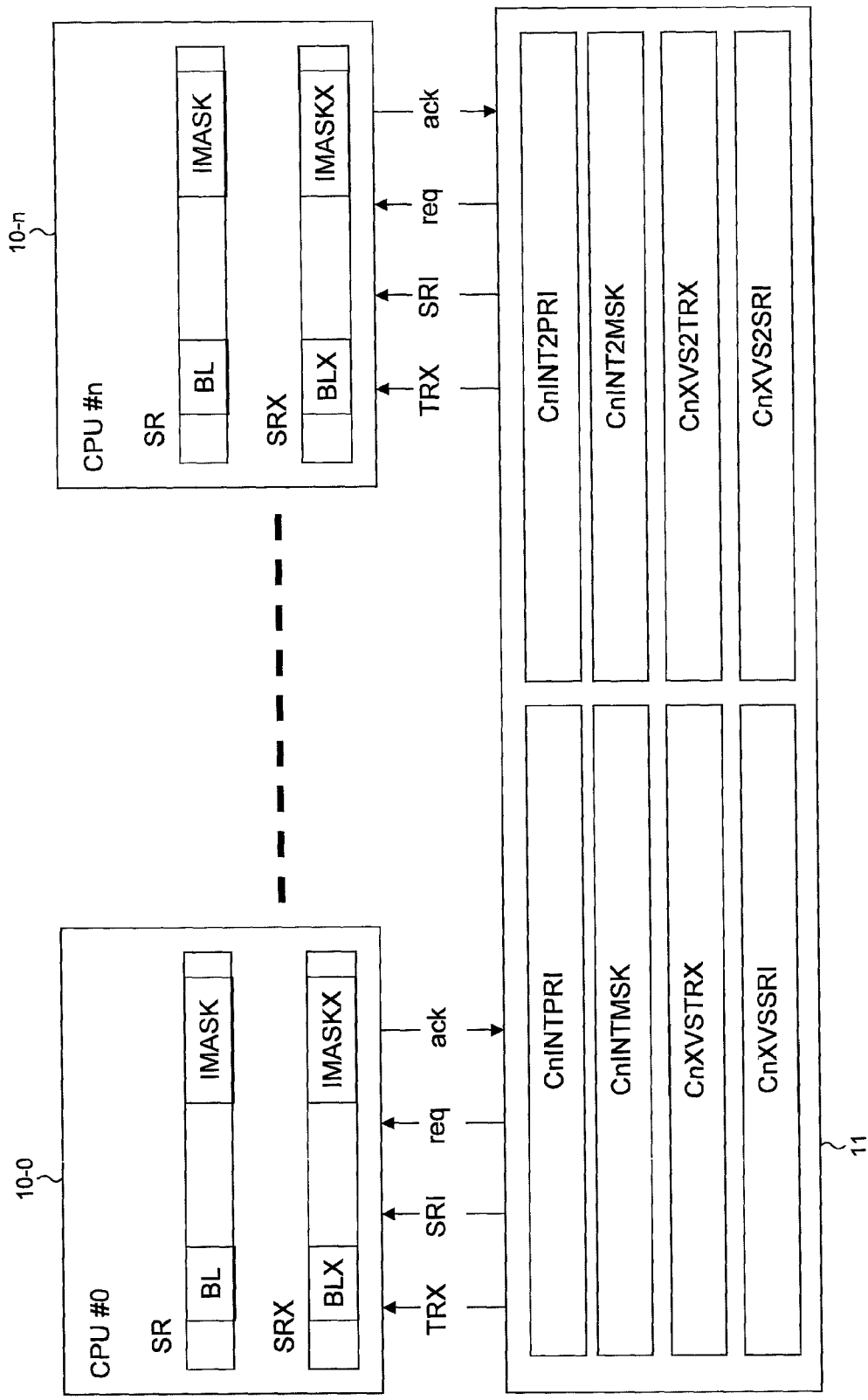
FIG. 8 illustrates registers in each CPU and registers in the interrupt controller.

Each CPU 10-0, 10-1, ..., 10-$n$ includes status registers SR, SRX, as is shown in FIG. 8. A status register SR has BL and IMASK bits. A status register SRX has BLX and IMASKX bits. A signal SRI indicating whether or not an interrupt requires transition to the XVS mode determines which register (SR or SRX) should be used to decide whether or not to accept the interrupt. That is, for an interrupt with SRI==0 (representing that SRI has a logical value of "0"), the CPU 10-0, 10-1, ..., 10-$n$ decides whether or not to accept it according to the BL and IMASK bits of the status register SR in the CPU. On the other hand, for an interrupt with SRI==1 (representing that SRI has a logical value of "1"), the CPU 10-0, 10-1, ..., 10-$n$ decides whether or not to accept it according to the BLX and IMASKX bits of the status register SRX in the CPU.

TRX also affects updating an interrupt disable flag. Upon accepting an interrupt with TRX==0, SR.BL becomes a logical value of "1". On the other hand, upon accepting an interrupt with TRX==1, SRX.BLX becomes a logical value of "1".

SRI also affects updating an interrupt mask level. Upon accepting an interrupt with SRI==0, SR.IMASK is updated to an accepted interrupt level. On the other hand, upon accepting an interrupt with SRI==1, SRX.IMASKX is updated to an accepted interrupt level.

Here, TRX==1 and SRI==0 are set with respect to an interrupt originating from a group of shared controlled peripheral devices 715 which are controlled with intervention of the hypervisor 105. TRX==0 and SRI==0 are set with respect to an interrupt originating from a group of dedicated controlled peripheral devices 716 which are controlled without intervention of the hypervisor 105. Depending on these settings, the hypervisor 105 takes a role in control of an interrupt originating from the group of shared controlled peripheral devices 715, but does not take a role in control of an interrupt originating from the group of dedicated controlled peripheral devices 716. A setting of SRI==1 is used to notify a system fault or the like, if it occurs, between hypervisors operating in each core. Even in this case, TRX is set to a logical value of "1". The group of shared controlled peripheral devices 715 includes the display device 108 in FIG. 1. The group of dedicated controlled peripheral device 716 includes the external device 110 and the network control device 107 in FIG. 1. For the settings as above, various registers provided in the interrupt control unit 11 are used.

FIG. 8 illustrates various registers in the interrupt control unit 11.

In the interrupt controller (INTC) 11, an interrupt priority order register CnINTRPI, a peripheral interrupt priority order register CnINT2RPI, an interrupt mask register CnINTMSK, and a peripheral interrupt mask register CnINT2MSK are provided. In the interrupt controller (INTO) 11, further, a transition XVS register CnXVSTRX, a peripheral transition XVS register CnXVS2TRX, an SR insensitive register CnXVSSRI, and a peripheral SR insensitive register CnXVS2SRI are provided. Each of these registers is assumed as a register for specifying data for control as to how each CPU 10-0, 10-1, ..., 10-n should operate to handle interrupt sources.

The interrupt priority order register CnINTPRI is provided per CPU 10-0, 10-1, ..., 10-n and sets, in four bits, priority orders from 0 to 15 of interrupt sources from IRQ0 to IRQ15 to be processed by the CPU 10-0, 10-1, ..., 10-n.

The peripheral interrupt priority order register CnINT2PRI is provided per CPU 10-0, 10-1, ..., 10-n and sets, in four bits, priority orders from 0 to 15 of interrupt sources originating from built-in peripheral devices to be processed by the CPU 10-0, 10-1, ..., 10-n.

The interrupt mask register CnINTMSK is provided per CPU 10-0, 10-1, ..., 10-n and sets, in one bit, whether or not the CPU 10-0, 10-1, ..., 10-n should mask each of the interrupt sources from IRQ0 to IRQ15.

The peripheral interrupt mask register CnINT2MSK is provided per CPU 10-0, 10-1, ..., 10-n and sets, in one bit, whether or not the CPU 10-0, 10-1, ..., 10-n should mask each of the interrupt sources originating from the built-in peripheral devices.

The transition XVS register CnXVSTRX is provided per CPU 10-0, 10-1, ..., 10-n and specifies, in one bit, whether the hypervisor mode (XVS mode) or the privilege mode is the operation mode into which the CPU 10-0, 10-1, ..., 10-n should transit upon accepting an interrupt for each of the interrupt sources from IRQ0 to IRQ15.

The SR insensitive register CnXVSSRI is provided per CPU 10-0, 10-1, ..., 10-n and specifies, in one bit, whether the status register (SR) or the XVS status register (SRX) is to be read by the CPU for control of, e.g., accepting a further interrupt request, when the CPU proceeds with processing after accepting an interrupt for each of the interrupt sources from IRQ0 to IRQ15.

The peripheral transition XVS register CnXVSTRX is provided per CPU 10-0, 10-1, ..., 10-n and specifies, in one bit, whether the hypervisor mode (XVS mode) or the privilege mode is the operation mode into which the CPU 10-0, 10-1, ..., 10-n should transit upon accepting an interrupt for the interrupt sources originating from the built-in peripheral devices.

The peripheral SR insensitive register CnXVSSRI is provided per CPU 10-0, 10-1, ..., 10-n and specifies, in one bit, whether the status register (SR) or the XVS status register (SRX) is to be read by the CPU for control of, e.g., accepting a further interrupt request, when the CPU proceeds with processing after accepting an interrupt for the interrupt sources originating from the built-in peripheral devices.

The status register SR and XVS status register SRX in each CPU10-0, 10-1, ..., 10-n hold data for specifying a control of accepting an interrupt. In the status register SR, the BL bit is a one-bit register for masking an interrupt request and the IMASK bits are a four-bit register for masking an interrupt at or below the IMASK level. In the XVS status register SRX, the BLX bit is a one-bit register for masking an interrupt request and the IMASKX bits are a four-bit register for masking an interrupt at or below the IMASKX level. Whether the status register SR or the XVS status register XVS, depending on which the CPU 10-0, 10-1, ..., 10-n controls accepting an interrupt, is determined by the SRI signal received at the time of accepting an interrupt that triggered transition of the operation mode of the CPU 10-0, 10-1, ..., 10-n.

FIG. 9 illustrates concrete examples of transition XVS registers for specifying whether or not each CPU transits into the XVS mode in response to each interrupt source.

Bits in the transition XVS register CnXVSTRX have the following functions.

TX31 specifies whether or not an IRL interrupt is an interrupt destined for XVS. TX7 specifies whether or not an IRQ7 interrupt is an interrupt destined for XVS. TX6 specifies whether or not an IRQ7 interrupt is an interrupt destined for XVS. TX5 specifies whether or not an IRQ7 interrupt is an interrupt destined for XVS. TX4 specifies whether or not an IRQ7 interrupt is an interrupt destined for XVS. TX3 specifies whether or not an IRQ7 interrupt is an interrupt destined for XVS. TX2 specifies whether or not an IRQ7 interrupt is an interrupt destined for XVS. TX1 specifies whether or not an IRQ7 interrupt is an interrupt destined for XVS. TX0 specifies whether or not an IRQ7 interrupt is an interrupt destined for XVS. The peripheral transition XVS register CnXVS2TRX includes CnXVS2TRX0, CnXVS2TRX1, CnXVS2TRX2, CnXVS2TRX3, and CnXVS2TRX4.

Bits in the register CnXVS2TRX0 have the following functions.

TX24 specifies whether or not an interrupt from an IIC (Inter-Integrated Circuit) which is assumed as an example of a serial bus is an interrupt destined for XVS. TX23 specifies whether or not an interrupt from LCDC1 is an interrupt destined for XVS. TX21 specifies whether or not an interrupt from GPIO2 in the general-purpose I/O control unit 16 is an interrupt destined for XVS. TX20 specifies whether or not an interrupt from GPIO1 in the general-purpose I/O control unit 16 is an interrupt destined for XVS. TX19 specifies whether or not an interrupt from TMU11 in a timer unit (TMU), which is not shown, is an interrupt destined for XVS. TX18 specifies whether or not an interrupt from TMU10 is an interrupt destined for XVS. TX17 specifies whether or not an interrupt from TMU9 is an interrupt destined for XVS. TX16 specifies whether or not an interrupt from TMU8 is an interrupt destined for XVS. TX15 specifies whether or not an interrupt from TMU7 is an interrupt destined for XVS. TX14 specifies whether or not an interrupt from TMU6 is an interrupt destined for XVS. TX13 specifies whether or not an interrupt from TMU5 is an interrupt destined for XVS. TX12 specifies whether or not an interrupt from TMU4 is an interrupt destined for XVS. TX11 specifies whether or not an interrupt from TMU3 is an interrupt destined for XVS. TX10 specifies whether or not an interrupt from TMU2 is an interrupt destined for XVS. TX9 specifies whether or not an interrupt from TMU1 is an interrupt destined for XVS. TX8 specifies whether or not an interrupt from TMU0 is an interrupt destined for XVS. TX7 specifies whether or not an interrupt from H-UDI3 which is assumed as an interface for debugging is an interrupt destined for XVS. TX6 specifies whether or not an interrupt from H-UDI2 is an interrupt destined for XVS TX5 specifies whether or not an interrupt from H-UDI1 is an interrupt destined for XVS. TX4 specifies whether or not an interrupt from H-UDI0 is an interrupt destined for XVS. TX3 specifies whether or not an interrupt from H-UDI3 is an interrupt destined for XVS. TX2 specifies whether or not an interrupt from H-UDI2 is an interrupt destined for XVS. TX1 specifies whether or not an interrupt from H-UDI1 is an interrupt destined for XVS. TX0 specifies whether or not an interrupt from H-UDI0 is an interrupt destined for XVS.

Bits in the register CnXVS2TRX1 have the following functions.

TX13 specifies whether or not an address error interrupt for DMAC channels 6-11 in the DMAC 15 is an interrupt destined for XVS. TX12 specifies whether or not an interrupt from DMAC channel 11 is an interrupt destined for XVS. TX11 specifies whether or not an interrupt from DMAC channel 10 is an interrupt destined for XVS. TX10 specifies whether or not an interrupt from DMAC channel 9 is an interrupt destined for XVS. TX9 specifies whether or not an interrupt from DMAC channel 8 is an interrupt destined for XVS. TX8 specifies whether or not an interrupt from DMAC channel 7 is an interrupt destined for XVS. TX7 specifies whether or not an interrupt from DMAC channel 6 is an interrupt destined for XVS. TX6 specifies whether or not an address error interrupt for DMAC channel 0- is an interrupt destined for XVS. TX5 specifies whether or not an interrupt from DMAC channel 5 is an interrupt destined for XVS. TX4 specifies whether or not an interrupt from DMAC channel 4 is an interrupt destined for XVS. TX3 specifies whether or not an interrupt from DMAC channel 3 is an interrupt destined for XVS. TX2 specifies whether or not an interrupt from DMAC channel 2 is an interrupt destined for XVS. TX1 specifies whether or not an interrupt from DMAC channel 1 is an interrupt destined for XVS. TX0 specifies whether or not an interrupt from DMAC channel 1 is an interrupt destined for XVS.

Bits in the register CnXVS2TRX2 have the following functions.

TX29 specifies whether or not an interrupt from SATAI13 which is an extended specification of IDE (ATA) standard is an interrupt destined for XVS. TX28 specifies whether or not an interrupt from SATAI12 is an interrupt destined for XVS. TX27 specifies whether or not an interrupt from SATAI11 is an interrupt destined for XVS. TX26 specifies whether or not an interrupt from SATAI10 is an interrupt destined for XVS. TX25 specifies whether or not an interrupt from SATAI9 is an interrupt destined for XVS. TX24 specifies whether or not an interrupt from SATAI8 is an interrupt destined for XVS. TX23 specifies whether or not an interrupt from SATAI7 is an interrupt destined for XVS. TX22 specifies whether or not an interrupt from SATAI6 is an interrupt destined for XVS. TX21 specifies whether or not an interrupt from SATAI5 is an interrupt destined for XVS. TX20 specifies whether or not an interrupt from SATAI4 is an interrupt destined for XVS. TX19 specifies whether or not an interrupt from SATAI3 is an interrupt destined for XVS. TX18 specifies whether or not an interrupt from SATAI2 is an interrupt destined for XVS. TX17 specifies whether or not an interrupt from SATAI1 is an interrupt destined for XVS. TX16 specifies whether or not an interrupt from SATAI0 is an interrupt destined for XVS. TX15 specifies whether or not an interrupt from SCIF3 TXI which is assumed as a serial communication interface with FIFO (First-In First-Out) is an interrupt destined for XVS. TX14 specifies whether or not an interrupt from SCIF3 BRI is an interrupt destined for XVS. TX13 specifies whether or not an interrupt from SCIF3 RXI is an interrupt destined for XVS. TX12 specifies whether or not an interrupt from SCIF3 ERI is an interrupt destined for XVS. TX11 specifies whether or not an interrupt from SCIF2 TXI is an interrupt destined for XVS. TX10 specifies whether or not an interrupt from SCIF2 BRI is an interrupt destined for XVS. TX9 specifies whether or not an interrupt from SCIF2 RXI is an interrupt destined for XVS. TX8 specifies whether or not an interrupt from SCIF2 ERI is an interrupt destined for XVS. TX7 specifies whether or not an interrupt from SCIF1 TXI is an interrupt destined for XVS. TX6 specifies whether or not an interrupt from SCIF1 BRI is an interrupt destined for XVS. TX5 specifies whether or not an interrupt from SCIF1 RXI is an interrupt destined for XVS. TX4 specifies whether or not an interrupt from SCIF1 ERI is an interrupt destined for XVS. TX3 specifies whether or not an interrupt from SCIF0 TXI is an interrupt destined for XVS. TX2 specifies whether or not an interrupt from SCIF0 BRI is an interrupt destined for XVS. TX1 specifies whether or not an interrupt from SCIF0 RXI is an interrupt destined for XVS. TX0 specifies whether or not an interrupt from SCIF0 ERI is an interrupt destined for XVS.

Bits in the register CnXVS2TRX3 have the following functions.

TX22 specifies whether or not an interrupt from PCI-EXP_0 PCI0(22) which is a serial interface is an interrupt destined for XVS. TX21 specifies whether or not an interrupt from PCI-EXP_0 PCI0(21) is an interrupt destined for XVS. TX20 specifies whether or not an interrupt from PCI-EXP_0 PCI0(22) is an interrupt destined for XVS. TX19 specifies whether or not an interrupt from PCI-EXP_0 PCI0(19) is an interrupt destined for XVS. TX18 specifies whether or not an interrupt from PCI-EXP_0 PCI0(18) is an interrupt destined for XVS. TX17 specifies whether or not an interrupt from PCI-EXP_0 PCI0(17) is an interrupt destined for XVS. TX16 specifies whether or not an interrupt from PCI-EXP_0 PCI0 (16) is an interrupt destined for XVS. TX15 specifies whether or not an interrupt from PCI-EXP_0 PCI0(15) is an interrupt destined for XVS. TX14 specifies whether or not an interrupt from PCI-EXP_0 PCI0(14) is an interrupt destined for XVS. TX13 specifies whether or not an interrupt from PCI-EXP_0 PCI0(13) is an interrupt destined for XVS. TX12 specifies whether or not an interrupt from PCI-EXP_0 PCI0(12) is an interrupt destined for XVS. TX11 specifies whether or not an interrupt from PCI-EXP_0 PCI0(11) is an interrupt destined for XVS. TX10 specifies whether or not an interrupt from PCI-EXP_0 PCI0(10) is an interrupt destined for XVS. TX9 specifies whether or not an interrupt from PCI-EXP_0 PCI0 (9) is an interrupt destined for XVS. TX8 specifies whether or not an interrupt from PCI-EXP_0 PCI0(8) is an interrupt destined for XVS. TX7 specifies whether or not an interrupt from PCI-EXP_0 PCI0(7) is an interrupt destined for XVS. TX6 specifies whether or not an interrupt from PCI-EXP_0

PCI0(6) is an interrupt destined for XVS. TX5 specifies whether or not an interrupt from PCI-EXP_0 PCI0(5) is an interrupt destined for XVS. TX4 specifies whether or not an interrupt from PCI-EXP_0 PCI0(4) is an interrupt destined for XVS. TX3 specifies whether or not an interrupt from PCI-EXP_0 PCI0(3) is an interrupt destined for XVS. TX2 specifies whether or not an interrupt from PCI-EXP_0 PCI0(2) is an interrupt destined for XVS. TX1 specifies whether or not an interrupt from PCI-EXP_0 PCI0(1) is an interrupt destined for XVS. TX0 specifies whether or not an interrupt from PCI-EXP_0 PCI0(0) is an interrupt destined for XVS.

Bits in the register CnXVS2TRX4 have the following functions.

TX22 specifies whether or not an interrupt from PCI-EXP_1 PCI1(22) is an interrupt destined for XVS. TX21 specifies whether or not an interrupt from PCI-EXP_1 PCI1(21) is an interrupt destined for XVS. TX20 specifies whether or not an interrupt from PCI-EXP_1 PCI1(22) is an interrupt destined for XVS. TX19 specifies whether or not an interrupt from PCI-EXP_1 PCI1(19) is an interrupt destined for XVS. TX18 specifies whether or not an interrupt from PCI-EXP_1 PCI1(18) is an interrupt destined for XVS. TX17 specifies whether or not an interrupt from PCI-EXP_1 PCI1(17) is an interrupt destined for XVS. TX16 specifies whether or not an interrupt from PCI-EXP_1 PCI1(16) is an interrupt destined for XVS. TX15 specifies whether or not an interrupt from PCI-EXP_1 PCI1(15) is an interrupt destined for XVS. TX14 specifies whether or not an interrupt from PCI-EXP_1 PCI1(14) is an interrupt destined for XVS. TX13 specifies whether or not an interrupt from PCI-EXP_1 PCI1(13) is an interrupt destined for XVS. TX12 specifies whether or not an interrupt from PCI-EXP_1 PCI1(12) is an interrupt destined for XVS. TX11 specifies whether or not an interrupt from PCI-EXP_1 PCI1(11) is an interrupt destined for XVS. TX10 specifies whether or not an interrupt from PCI-EXP_1 PCI1(10) is an interrupt destined for XVS. TX9 specifies whether or not an interrupt from PCI-EXP_1 PCI1(9) is an interrupt destined for XVS. TX8 specifies whether or not an interrupt from PCI-EXP_1 PCI1(8) is an interrupt destined for XVS. TX7 specifies whether or not an interrupt from PCI-EXP_1 PCI1(7) is an interrupt destined for XVS. TX6 specifies whether or not an interrupt from PCI-EXP_1 PCI1(6) is an interrupt destined for XVS. TX5 specifies whether or not an interrupt from PCI-EXP_1 PCI1(5) is an interrupt destined for XVS. TX4 specifies whether or not an interrupt from PCI-EXP_1 PCI1(4) is an interrupt destined for XVS. TX3 specifies whether or not an interrupt from PCI-EXP_1 PCI1(3) is an interrupt destined for XVS. TX2 specifies whether or not an interrupt from PCI-EXP_1 PCI1(2) is an interrupt destined for XVS. TX1 specifies whether or not an interrupt from PCI-EXP_1 PCI1(1) is an interrupt destined for XVS. TX0 specifies whether or not an interrupt from PCI-EXP_1 PCI1(0) is an interrupt destined for XVS.

FIG. 10 illustrates concrete examples of SR insensitive registers CnXVSSRI for specifying whether or not the SRX (status register) should be used by the CPU 10-0, 10-1, ..., 10-n upon accepting an interrupt in response to each interrupt source.

Bits in the register CnXVSSRI have the following functions.

TX31 specifies whether or not SRX should be used upon accepting an IRL interrupt. TX7 specifies whether or not SRX should be used upon accepting an IRQ7 interrupt. TX6 specifies whether or not SRX should be used upon accepting an IRQ7 interrupt. TX5 specifies whether or not SRX should be used upon accepting an IRQ7 interrupt. TX4 specifies whether or not SRX should be used upon accepting an IRQ7 interrupt. TX3 specifies whether or not SRX should be used upon accepting an IRQ7 interrupt. TX2 specifies whether or not SRX should be used upon accepting an IRQ7 interrupt. TX1 specifies whether or not SRX should be used upon accepting an IRQ7 interrupt. TX0 specifies whether or not SRX should be used upon accepting an IRQ7 interrupt. Bits in the register CnXVS2TRX0 have the following functions. TX24 specifies whether or not SRX should be used upon accepting an interrupt from IIC. TX23 specifies whether or not SRX should be used upon accepting an interrupt from LCDC1. TX21 specifies whether or not SRX should be used upon accepting an interrupt from GPIO2. TX20 specifies whether or not SRX should be used upon accepting an interrupt from GPIO1. TX19 specifies whether or not SRX should be used upon accepting an interrupt from TMU11. TX18 specifies whether or not SRX should be used upon accepting an interrupt from TMU10. TX17 specifies whether or not SRX should be used upon accepting an interrupt from TMU9. TX16 specifies whether or not SRX should be used upon accepting an interrupt from TMU8. TX15 specifies whether or not SRX should be used upon accepting an interrupt from TMU7. TX14 specifies whether or not SRX should be used upon accepting an interrupt from TMU6. TX13 specifies whether or not SRX should be used upon accepting an interrupt from TMU5. TX12 specifies whether or not SRX should be used upon accepting an interrupt from TMU4. TX11 specifies whether or not SRX should be used upon accepting an interrupt from TMU3. TX10 specifies whether or not SRX should be used upon accepting an interrupt from TMU2. TX9 specifies whether or not SRX should be used upon accepting an interrupt from TMU1. TX8 specifies whether or not SRX should be used upon accepting an interrupt from TMU0. TX7 specifies whether or not SRX should be used upon accepting an interrupt from H-UDI3. TX6 specifies whether or not SRX should be used upon accepting an interrupt from H-UDI2. TX5 specifies whether or not SRX should be used upon accepting an interrupt from H-UDI1. TX4 specifies whether or not SRX should be used upon accepting an interrupt from H-UDI0. TX3 specifies whether or not SRX should be used upon accepting an interrupt from H-UDI3. TX2 specifies whether or not SRX should be used upon accepting an interrupt from H-UDI2. TX1 specifies whether or not SRX should be used upon accepting an interrupt from H-UDI1. TX0 specifies whether or not SRX should be used upon accepting an interrupt from H-UDI0.

Bits in the register CnXVS2TRX1 have the following functions. TX13 specifies whether or not SRX should be used upon accepting an address error interrupt for DMAC channels 6-11. TX12 specifies whether or not SRX should be used upon accepting an interrupt from DMAC channel 11. TX11 specifies whether or not SRX should be used upon accepting an interrupt from DMAC channel 10. TX10 specifies whether or not SRX should be used upon accepting an interrupt from DMAC channel 9. TX9 specifies whether or not SRX should be used upon accepting an interrupt from DMAC channel 8. TX8 specifies whether or not SRX should be used upon accepting an interrupt from DMAC channel 7. TX7 specifies whether or not SRX should be used upon accepting an interrupt from DMAC channel 6. TX6 specifies whether or not SRX should be used upon accepting an address error interrupt for DMAC channel 0-. TX5 specifies whether or not SRX should be used upon accepting an interrupt from DMAC channel 5. TX4 specifies whether or not SRX should be used upon accepting an interrupt from DMAC channel 4. TX3 specifies whether or not SRX should be used upon accepting an interrupt from DMAC channel 3. TX2 specifies whether or not SRX should be used upon accepting an interrupt from DMAC channel 2. TX1 specifies whether or not SRX should be used upon accepting an interrupt from DMAC channel 1. TX0 specifies whether or not SRX should be used upon accepting an interrupt from DMAC channel 1.

Bits in the register CnXVS2TRX2 have the following functions.

TX29 specifies whether or not SRX should be used upon accepting an interrupt from SATAI13. TX28 specifies whether or not SRX should be used upon accepting an interrupt from SATAI12. TX27 specifies whether or not SRX should be used upon accepting an interrupt from SATAI11. TX26 specifies whether or not SRX should be used upon accepting an interrupt from SATAI10. TX25 specifies whether or not SRX should be used upon accepting an interrupt from SATAI9. TX24 specifies whether or not SRX should be used upon accepting an interrupt from SATAI8. TX23 specifies whether or not SRX should be used upon accepting an interrupt from SATAI7. TX22 specifies whether or not SRX should be used upon accepting an interrupt from SATAI6. TX21 specifies whether or not SRX should be used upon accepting an interrupt from SATAI5. TX20 specifies whether or not SRX should be used upon accepting an interrupt from SATAI4. TX19 specifies whether or not SRX should be used upon accepting an interrupt from SATAI3. TX18 specifies whether or not SRX should be used upon accepting an interrupt from SATAI2. TX17 specifies whether or not SRX should be used upon accepting an interrupt from SATAI1. TX16 specifies whether or not SRX should be used upon accepting an interrupt from SATAI0. TX15 specifies whether or not SRX should be used upon accepting an interrupt from SCIF3 TXI. TX14 specifies whether or not SRX should be used upon accepting an interrupt from SCIF3 BRI. TX13 specifies whether or not SRX should be used upon accepting an interrupt from SCIF3 RXI. TX12 specifies whether or not SRX should be used upon accepting an interrupt from SCIF3 ERI. TX11 specifies whether or not SRX should be used upon accepting an interrupt from SCIF2 TXI. TX10 specifies whether or not SRX should be used upon accepting an interrupt from SCIF2 BRI. TX9 specifies whether or not SRX should be used upon accepting an interrupt from SCIF2 RXI. TX8 specifies whether or not SRX should be used upon accepting an interrupt from SCIF2 ERI. TX7 specifies whether or not SRX should be used upon accepting an interrupt from SCIF1 TXI. TX6 specifies whether or not SRX should be used upon accepting an interrupt from SCIF1 BRI. TX5 specifies whether or not SRX should be used upon accepting an interrupt from SCIF1 RXI. TX4 specifies whether or not SRX should be used upon accepting an interrupt from SCIF1 ERI. TX3 specifies whether or not SRX should be used upon accepting an interrupt from SCIF0 TXI. TX2 specifies whether or not SRX should be used upon accepting an interrupt from SCIF0 BRI. TX1 specifies whether or not SRX should be used upon accepting an interrupt from SCIF0 RXI. TX0 specifies whether or not SRX should be used upon accepting an interrupt from SCIF0 ERI. Bits in the register CnXVS2TRX3 have the following functions. TX22 specifies whether or not SRX should be used upon accepting an interrupt from PCI-EXP_0 PCI0(22). TX21 specifies whether or not SRX should be used upon accepting an interrupt from PCI-EXP_0 PCI0(21). TX20 specifies whether or not SRX should be used upon accepting an interrupt from PCI-EXP_0 PCI0(22). TX19 specifies whether or not SRX should be used upon accepting an interrupt from PCI-EXP_0 PCI0(19). TX18 specifies whether or not SRX should be used upon accepting an interrupt from PCI-EXP_0 PCI0(18). TX17 specifies whether or not SRX should be used upon accepting an interrupt from PCI-EXP_0 PCI0(17). TX16 specifies whether or not SRX should be used upon accepting an interrupt from PCI-EXP_0 PCI0(16). TX15 specifies whether or not SRX should be used upon accepting an interrupt from PCI-EXP_0 PCI0(15). TX14 specifies whether or not SRX should be used upon accepting an interrupt from PCI-EXP_0 PCI0(14). TX13 specifies whether or not SRX should be used upon accepting an interrupt from PCI-EXP_0 PCI0(13). TX12 specifies whether or not SRX should be used upon accepting an interrupt from PCI-EXP_0 PCI0(12). TX11 specifies whether or not SRX should be used upon accepting an interrupt from PCI-EXP_0 PCI0(11). TX10 specifies whether or not SRX should be used upon accepting an interrupt from PCI-EXP_0 PCI0(10). TX9 specifies whether or not SRX should be used upon accepting an interrupt from PCI-EXP_0 PCI0(9). TX8 specifies whether or not SRX should be used upon accepting an interrupt from PCI-EXP_0 PCI0(8). TX7 specifies whether or not SRX should be used upon accepting an interrupt from PCI-EXP_0 PCI0(7). TX6 specifies whether or not SRX should be used upon accepting an interrupt from PCI-EXP_0 PCI0(6). TX5 specifies whether or not SRX should be used upon accepting an interrupt from PCI-EXP_0 PCI0(5). TX4 specifies whether or not SRX should be used upon accepting an interrupt from PCI-EXP_0 PCI0(4). TX3 specifies whether or not SRX should be used upon accepting an interrupt from PCI-EXP_0 PCI0(3). TX2 specifies whether or not SRX should be used upon accepting an interrupt from PCI-EXP_0 PCI0(2). TX1 specifies whether or not SRX should be used upon accepting an interrupt from PCI-EXP_0 PCI0(1). TX0 specifies whether or not SRX should be used upon accepting an interrupt from PCI-EXP_0 PCI0(0).

Bits in the register CnXVS2TRX4 have the following functions.

TX22 specifies whether or not SRX should be used upon accepting an interrupt from PCI-EXP_1 PCI1(22). TX21 specifies whether or not SRX should be used upon accepting an interrupt from PCI-EXP_1 PCI1(21). TX20 specifies whether or not SRX should be used upon accepting an interrupt from PCI-EXP_1 PCI1(22). TX19 specifies whether or not SRX should be used upon accepting an interrupt from PCI-EXP_1 PCI1(19). TX18 specifies whether or not SRX should be used upon accepting an interrupt from PCI-EXP_1 PCI1(18). TX17 specifies whether or not SRX should be used upon accepting an interrupt from PCI-EXP_1 PCI1(17). TX16 specifies whether or not SRX should be used upon accepting an interrupt from PCI-EXP_1 PCI1(16). TX15 specifies whether or not SRX should be used upon accepting an interrupt from PCI-EXP_1 PCI1(15). TX14 specifies whether or not SRX should be used upon accepting an interrupt from PCI-EXP_1 PCI1(14). TX13 specifies whether or not SRX should be used upon accepting an interrupt from PCI-EXP_1 PCI1(13). TX12 specifies whether or not SRX should be used upon accepting an interrupt from PCI-EXP_1 PCI1(12). TX11 specifies whether or not SRX should be used upon accepting an interrupt from PCI-EXP_1 PCI1(11). TX10 specifies whether or not SRX should be used upon accepting an interrupt from PCI-EXP_1 PCI1(10). TX9 specifies whether or not SRX should be used upon accepting an interrupt from PCI-EXP_1 PCI1(9). TX8 specifies whether or not SRX should be used upon accepting an interrupt from PCI-EXP_1 PCI1(8). TX7 specifies whether or not SRX should be used upon accepting an interrupt from PCI-EXP_1 PCI1(7). TX6 specifies whether or not SRX should be used upon accepting an interrupt from PCI-EXP_1 PCI1(6). TX5 specifies whether or not SRX should be used upon accepting an interrupt from PCI-EXP_1 PCI1(5). TX4 specifies whether or not SRX should be used upon accepting an interrupt from PCI-EXP_1 PCI1(4). TX3 specifies whether or not SRX should be used upon accepting an interrupt from PCI-EXP_1 PCI1(3). TX2 specifies whether or not SRX should be used upon accepting an interrupt from PCI-EXP_1 PCI1(2). TX1 specifies whether or not SRX should be used upon accepting an interrupt from PCI-EXP_1 PCI1(1). TX0 specifies whether or not SRX should be used upon accepting an interrupt from PCI-EXP_1 PCI1(0).

While the invention made by the present inventors has been described specifically based on its embodiments hereinbefore, it will be appreciated that the present invention is not limited to the described embodiments and various modifications may be made without departing from the scope of the invention.

What is claimed is:

1. A data processor comprising a processor equipped with interfaces via which peripheral devices can be coupled to the processor,
the data processor incorporating therein a hypervisor for realizing a virtual machine on top of the processor and a plurality of operating systems governed by the hypervisor,
wherein the peripheral devices are classified into dedicated controlled peripheral devices which are solely operable under a single operating system and application programs to be run under control of the operating system and shared controlled peripheral devices which are operable under the operating systems and application programs to be run under control of these operating systems, and
wherein the processor further comprises a set of registers in which data is settable to implement control of one of the shared controlled peripheral devices by an operating system that controls the execution of an application program relevant to processing of that control of the one of the shared controlled peripheral devices via processing by the hypervisor and to implement control of one of the dedicated controlled peripheral devices by an operating system that controls the execution of an application program relevant to processing of that control of the one of the dedicated controlled peripheral devices without intervention of processing by the hypervisor.

2. The data processor according to claim 1, wherein, when the processor interacts with a dedicated controlled peripheral device, no exception is generated by access to one of control registers for the dedicated controlled peripheral device by one of the operating systems, and, when the processor interacts with a shared controlled peripheral device, an exception is generated by access to one of control registers for the shared controlled peripheral device by one of the operating systems and the processor activates a control program for the shared controlled peripheral device within the hypervisor.

3. The data processor according to claim 2, wherein, in the case of interaction with a dedicated controlled peripheral device, a program execution by the processor is caused to transit into the execution of a control program related to the dedicated controlled peripheral device by an operating system that governs the peripheral device, and, in the case of interaction with a shared controlled peripheral device, the program execution by the processor is caused to transit into the execution of a control program related to the shared controlled peripheral device within the hypervisor.

4. The data processor according to claim 2,
wherein the control registers for the peripheral devices are allocated to continuous segments of an area in a physical address space, and
wherein the set of registers comprises transition control address segment setting registers which specify whether or not an exception is generated by access to a segment in which control data for one of the peripheral devices is stored.

5. The data processor according to claim 4, wherein the control registers for the peripheral devices are allocated to segments in the physical address space, wherein the size of each segment is equal to a value that is raised to the power of 2 and a segment start address is set to a multiple of the size value.

6. The data processor according to claim 2, wherein the set of registers comprises segment setting registers which can specify, for each of pre-assigned address segments of address areas to which system registers comprising the control registers for the peripheral devices are allocated respectively, whether access to the segment is hooked area access or non-hooked area access.

7. The data processor according to claim 1,
wherein control of a peripheral device under control of an operating system is performed by a privileged instruction, and
wherein, in the case of interaction with a dedicated controlled peripheral device, no exception is generated by access to one of control registers for the dedicated controlled peripheral device by an operating system, and, in the case of interaction with a shared controlled peripheral device, an exception is generated by access to one of control registers for the shared controlled peripheral device by an operating system and a control program for the shared controlled peripheral device within the hypervisor is activated.

8. The data processor according to claim 1, wherein a control program for performing control of a peripheral device under control of one of the operating systems is activated by an interrupt signal generated by the peripheral device and the processor comprises an interrupt control unit in which data can be specified to implement that: if an interrupt is requested by a dedicated controlled peripheral device, a control program for performing control of the dedicated controlled peripheral device by one of the operating systems is activated; or if an interrupt is requested by a shared controlled peripheral device, a control program for performing control of the shared controlled peripheral device by the hypervisor is activated.

9. The data processor according to claim 8, wherein the interrupt control unit comprises a transition XVS register in which it can be specified whether a control program by one of the operating systems or a control program by the hypervisor should be activated by an interrupt signal generated by peripheral processing in one of the peripheral devices.

10. The data processor according to claim 9,
wherein the processor comprises central processing units, and
wherein each of the central processing units comprises:
a first status register having a bit or bits for controlling whether or not the processor execution is to transit into interrupt processing depending on an interrupt level and a bit or bits for controlling whether or not the processor execution is to transit into interrupt processing depending on an interrupt; and
a second status register having a bit or bits for controlling whether or not the processor execution is to transit into interrupt processing depending on an interrupt level and a bit or bits for controlling whether or not the processor execution is to transit into interrupt processing depending on an interrupt.

11. The data processor according to claim 8, wherein the interrupt control unit comprises an insensitive register for specifying whether the first status register or the second status register should be used, according to the setting specified in which register, control is performed as to whether or not to make a transition of the processor execution when an interrupt occurs.

* * * * *